(12) United States Patent
Leimer

(10) Patent No.: US 10,574,801 B1
(45) Date of Patent: Feb. 25, 2020

(54) GRIP PAD

(71) Applicant: Handstands Promo, LLC, Salt Lake City, UT (US)

(72) Inventor: Stefan Leimer, Salt Lake City, UT (US)

(73) Assignee: Handstands Promo, LLC, Salt Lake City, UT (US)

( * ) Notice: Subject to any disclaimer, the term of this patent is extended or adjusted under 35 U.S.C. 154(b) by 0 days.

(21) Appl. No.: 16/246,193

(22) Filed: Jan. 11, 2019

(51) Int. Cl.
| | |
|---|---|
| *H04M 1/00* | (2006.01) |
| *H04M 1/02* | (2006.01) |
| *B32B 27/08* | (2006.01) |
| *B32B 9/04* | (2006.01) |
| *B60K 37/00* | (2006.01) |
| *B60K 35/00* | (2006.01) |
| *B60R 11/00* | (2006.01) |

(52) U.S. Cl.
CPC .............. *H04M 1/026* (2013.01); *B32B 9/045* (2013.01); *B32B 27/08* (2013.01); *B60K 35/00* (2013.01); *B60K 37/00* (2013.01); *B32B 2250/03* (2013.01); *B32B 2274/00* (2013.01); *B60K 2370/81* (2019.05); *B60R 2011/0063* (2013.01)

(58) Field of Classification Search
CPC ........ H04M 1/026; B32B 27/08; B32B 9/045; B32B 2250/03; B32B 2274/00; B60K 35/00; B60K 37/00; B60K 2370/81; B60R 2011/0063
USPC ........................................ 455/575.1; 370/338
See application file for complete search history.

(56) References Cited

U.S. PATENT DOCUMENTS

| | | |
|---|---|---|
| 2,466,502 A | 4/1949 | Stiller |
| 2,573,323 A | 10/1951 | Eshelman |
| 2,642,248 A | 6/1953 | Semon |
| 2,931,489 A | 4/1960 | Farnhol |
| 3,654,047 A | 4/1972 | Berkowitz |
| 3,655,129 A | 4/1972 | Seiner |
| 3,937,491 A | 2/1976 | Hilding |
| 4,226,944 A | 10/1980 | Stone et al. |
| D258,511 S | 3/1981 | Ashton |
| 4,651,354 A | 3/1987 | Petrey |
| RE32,834 E | 1/1989 | Cordts et al. |
| 4,836,488 A | 6/1989 | Ross |
| 4,944,311 A | 7/1990 | Eldridge, Jr. et al. |

(Continued)

FOREIGN PATENT DOCUMENTS

| | | |
|---|---|---|
| EP | 0 348 970 | 1/1990 |
| JP | S62-266179 | 11/1987 |

(Continued)

OTHER PUBLICATIONS

1999 Catalogue; Canadian Tire; 2 pages.

(Continued)

*Primary Examiner* — Marcos Batista
(74) *Attorney, Agent, or Firm* — Thorpe, North & Western, LLP

(57) ABSTRACT

A grip pad holds items, such as a mobile device or cell phone, to a support surface, such as a dashboard of a vehicle. The grip pad has a tacky bottom surface to releasably cling to the dashboard, and a tacky top surface to releasably cling to the cell phone. In addition, the grip pad can conform to a contour of the dashboard. The grip pad can have a bottom layer that is flexible to bend to an arcuate shape to match the dashboard.

21 Claims, 18 Drawing Sheets

(56) References Cited

U.S. PATENT DOCUMENTS

| | | | |
|---|---|---|---|
| 4,967,988 | A | 11/1990 | Nguyen |
| 4,986,496 | A | 1/1991 | Marentic et al. |
| 5,036,866 | A | 8/1991 | Eldridge, Jr. et al. |
| 5,115,071 | A | 5/1992 | Quay et al. |
| 5,174,607 | A | 12/1992 | Hill |
| 5,542,637 | A | 8/1996 | Schriner |
| 5,593,769 | A | 1/1997 | Wolf et al. |
| 5,595,194 | A | 1/1997 | Talbot |
| 5,599,617 | A | 2/1997 | Ewald |
| 5,638,249 | A | 6/1997 | Rubino et al. |
| 5,692,815 | A | 12/1997 | Murphy |
| 5,794,767 | A | 8/1998 | Wilson |
| D404,957 | S | 2/1999 | Cheris et al. |
| 5,899,010 | A | 5/1999 | Peck |
| 6,089,516 | A | 7/2000 | Yates |
| 6,111,055 | A | 8/2000 | Berger et al. |
| 6,117,526 | A | 9/2000 | Marks |
| 6,164,213 | A | 12/2000 | Topps et al. |
| 6,191,197 | B1 | 2/2001 | Wang et al. |
| 6,206,260 | B1 | 3/2001 | Covell et al. |
| 6,372,323 | B1 | 10/2002 | Kobe et al. |
| 6,506,271 | B1 | 1/2003 | Yates |
| 6,561,378 | B1 | 5/2003 | Roessler et al. |
| 6,610,382 | B1 | 8/2003 | Kobe et al. |
| 6,618,970 | B1 | 9/2003 | Fillman et al. |
| 6,640,477 | B1 | 11/2003 | Timpson et al. |
| 6,672,622 | B2 | 1/2004 | Barron |
| 6,673,409 | B1 | 1/2004 | Wheatley |
| 6,935,659 | B1 | 8/2005 | Weaver |
| 7,125,602 | B2 | 10/2006 | Wheatley |
| 7,252,867 | B2 | 8/2007 | Wheatley |
| D555,571 | S | 11/2007 | Eskandry |
| D573,075 | S | 7/2008 | Eskandry |
| 7,910,188 | B2 | 3/2011 | Wheatley |
| 7,923,088 | B2 | 4/2011 | Wheatley |
| 8,110,269 | B2 | 2/2012 | Wheatley |
| 8,110,270 | B2 | 2/2012 | Wheatley |
| 8,490,846 | B1 * | 7/2013 | Wheatley ............ B60R 11/02 224/277 |
| 8,501,294 | B1 | 8/2013 | Wheatley et al. |
| 8,518,510 | B1 | 8/2013 | Wheatley et al. |
| 8,851,349 | B2 | 10/2014 | Wheatley et al. |
| 2002/0119292 | A1 | 8/2002 | Venkatasanthanam et al. |
| 2004/0084492 | A1 | 5/2004 | Wheatley |
| 2005/0199668 | A1 | 9/2005 | Wheatley |
| 2005/0271847 | A1 | 12/2005 | Antonini |
| 2005/0274852 | A1 | 12/2005 | Saez et al. |
| 2006/0121250 | A1 | 6/2006 | Wheatley |
| 2006/0154029 | A1 | 7/2006 | Antonini |
| 2006/0198978 | A1 | 9/2006 | Antonini |
| 2009/0004420 | A1 | 1/2009 | Wheatley |
| 2010/0001151 | A1 | 1/2010 | Wheatley et al. |
| 2011/0155884 | A1 | 6/2011 | Wheatley |
| 2011/0165383 | A1 | 7/2011 | Wheatley |
| 2013/0292440 | A1 | 11/2013 | Wheatley |

FOREIGN PATENT DOCUMENTS

| | | |
|---|---|---|
| WO | WO 02/35975 | 5/2002 |
| WO | WO 02/38029 | 5/2002 |
| ZA | 20004637 | 9/2000 |

OTHER PUBLICATIONS

3M, Product Bulletin PIJ180/180C, Release G, Effective Oct. 2008; 12 pages.
Cellgells Stick Almost Anywhere—Cell Phones, Music Devices, Laptops, Helmets, Cars . . . ; http://www.celgells.com; 1 page; as accessed on Jun. 5, 2009.
Crown Products; 2002; www.crownprod.com.
Dashmat Ultimate the Revolutionary Breakthrough Dashboard Cover; Saddleman Inc. 1998; 2 pages.
Derwent; abstract of JP 62-266179 to Koyanagi; Derwent World Patents Index.
Derwent; abstract of KR 2001-0091060 to Lim; Derwnt World Patents Index.
Egrips® Non-slip! Technology; http://www.egrips.com/technology; 2 pages; as accessed on Nov. 19, 2009.
Egrips® Non-slip! Technology; http://egrips.com/ ;3 pages; as accessed on Jun. 22, 2009.
Egrips® Non-slip! Technology; http://egrips.com/faq; 3 pages; as accessed on Jun. 22, 2009.
FNN—Fleet NewsNet: Company Car Fleet Management Solutions; p. 1-4; Roadtest; www.fleetnewsnet.co.uk.
General Electric "Friction Pad Kit" Instructions Field Made for MPD, MPD Friction Pad; Aug. 19, 1988; 6 pages.
Grip N Stay, It's Time to Get a Grip; http://www.gripnstay.com/catalog/index.php?main_page=index; 1 page; as accessed on Dec. 4, 2009.
http://bracketron.com/index.php?catied=16&pid=24; Bracketron, Inc.; Nav-Mat Portable GPS Dash Mount; as accessed Nov. 2009; 2 pages.
http://www.bracketron.com/?catid=11; bracketron Inc.; GPS Accessories; as accessed Nov. 2009; 2 pages.
http://www.bracketron.com/?includes/phpThumb/phpThumb.php?src-../../_products/UFM-100B . . . ; Bracketron Inc.; NavMat; as accessed Nov. 2009; 1 page.
Merriam Webster: Definition of catalyst (noun); Merriam Webster (Concise Encyclopedia) 2014; http://www.merriam-webster.com/dictionary/catalyst; 4 pages.
Non-Slip Grip-it-Strips® for Laptops; 1 page; 2010.

* cited by examiner

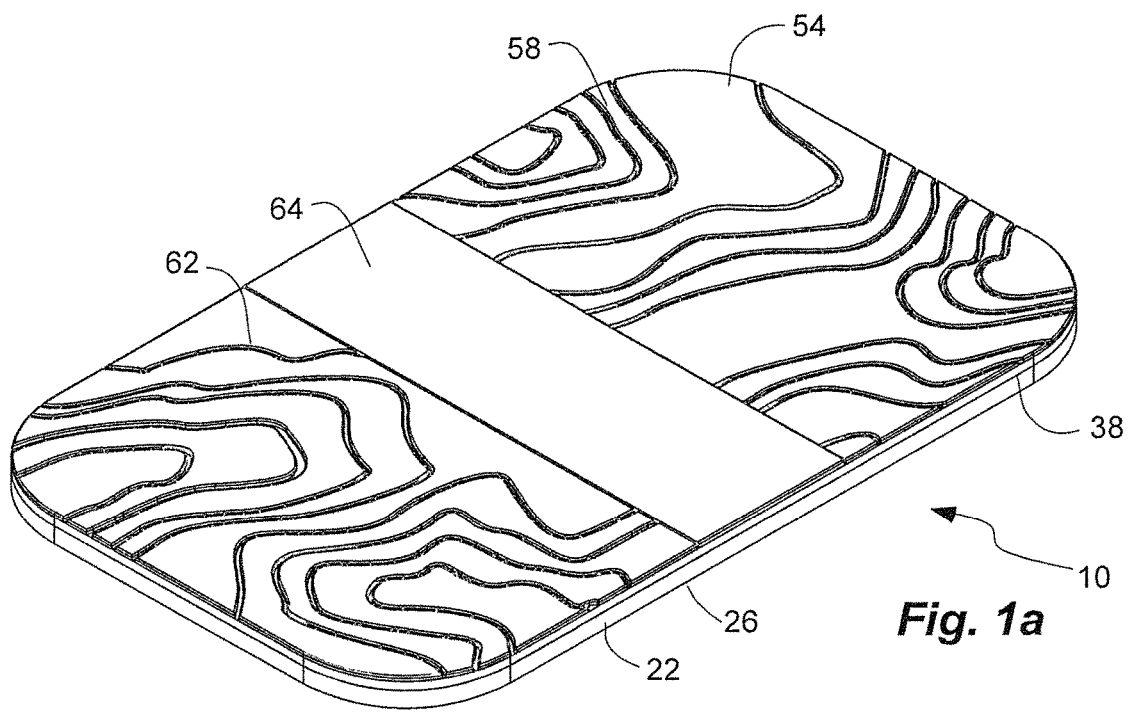
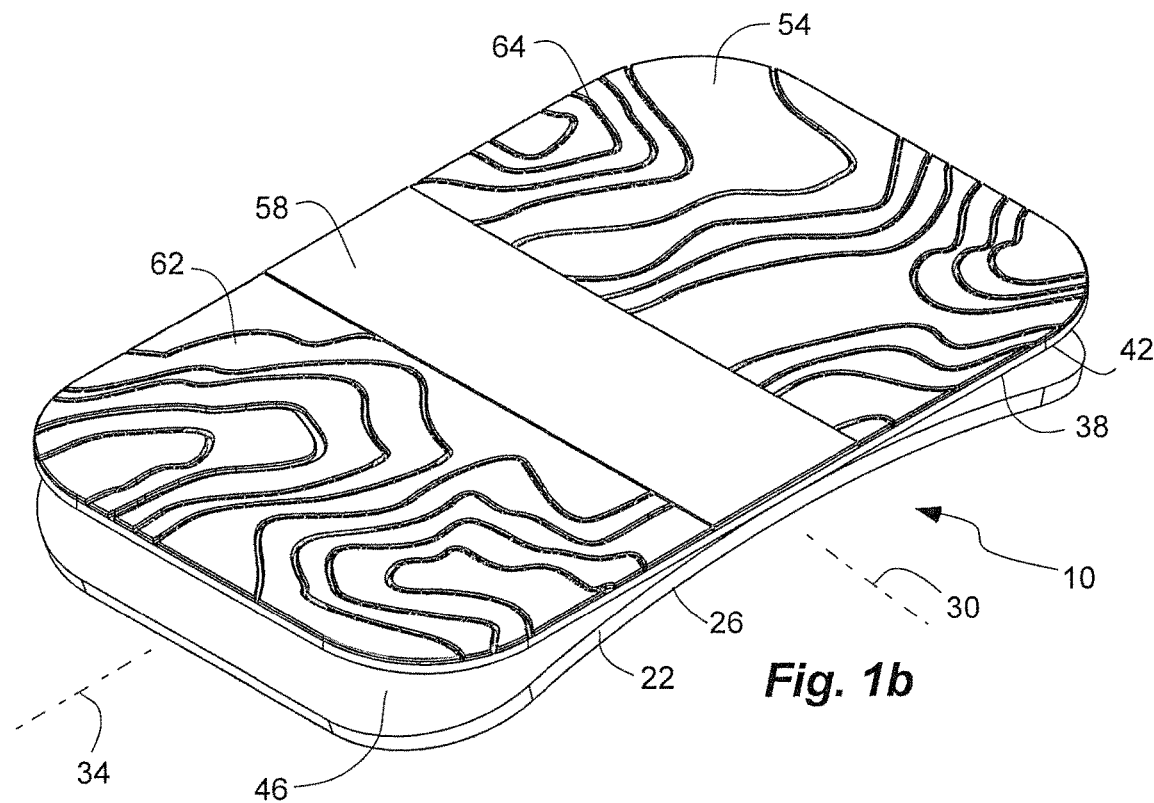

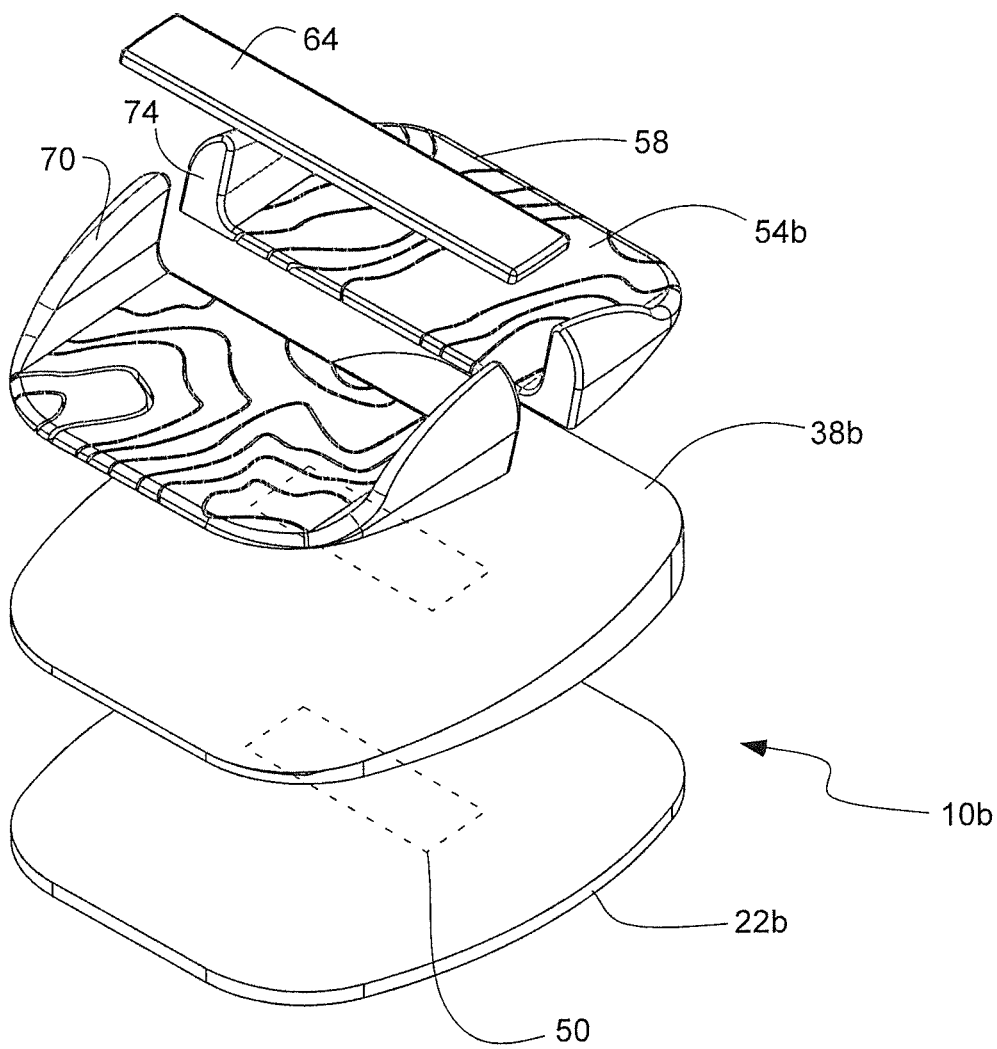
Fig. 15
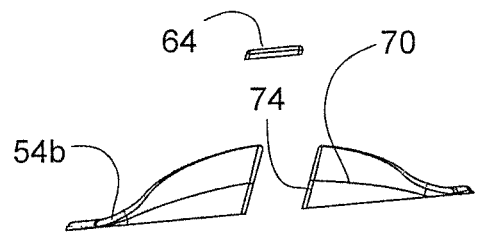
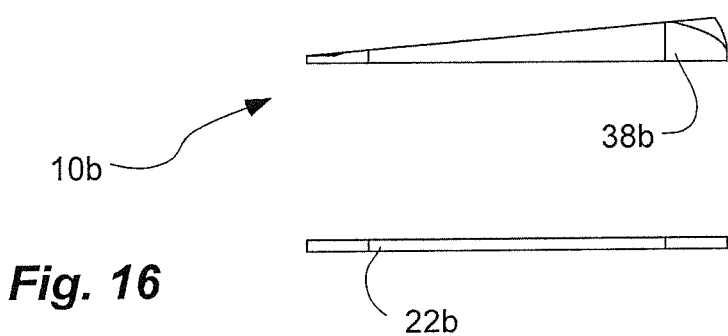
Fig. 16

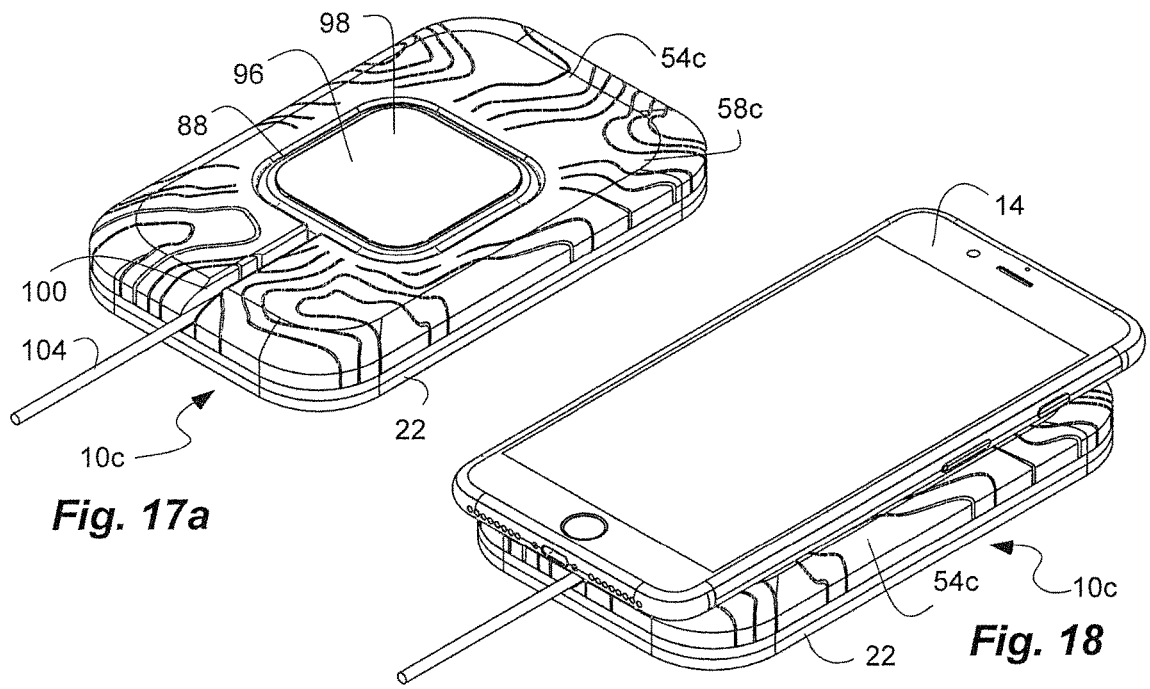
*Fig. 17a*
*Fig. 18*
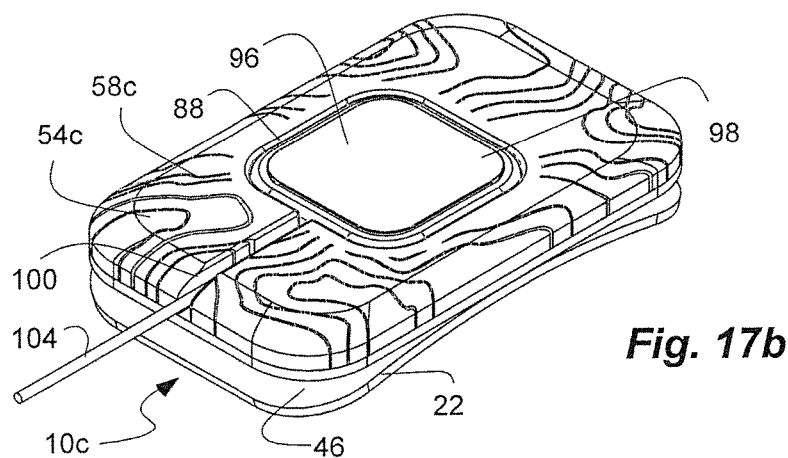
*Fig. 17b*
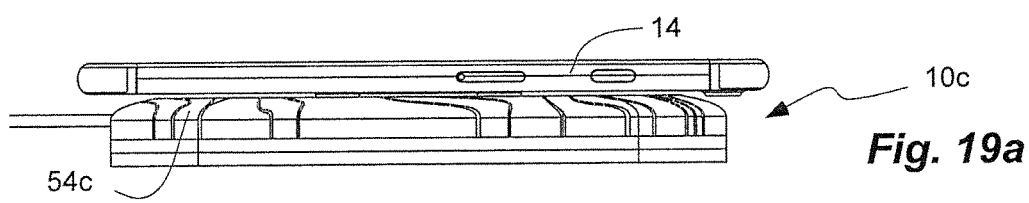
*Fig. 19a*
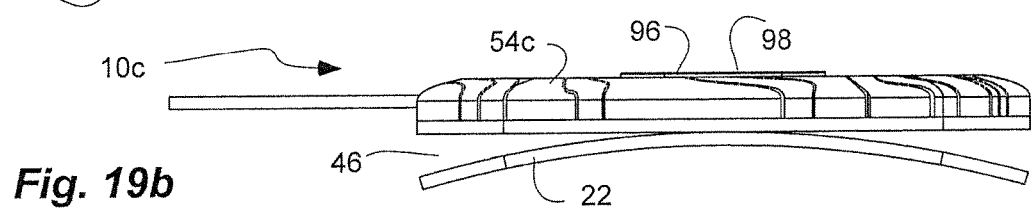
*Fig. 19b*

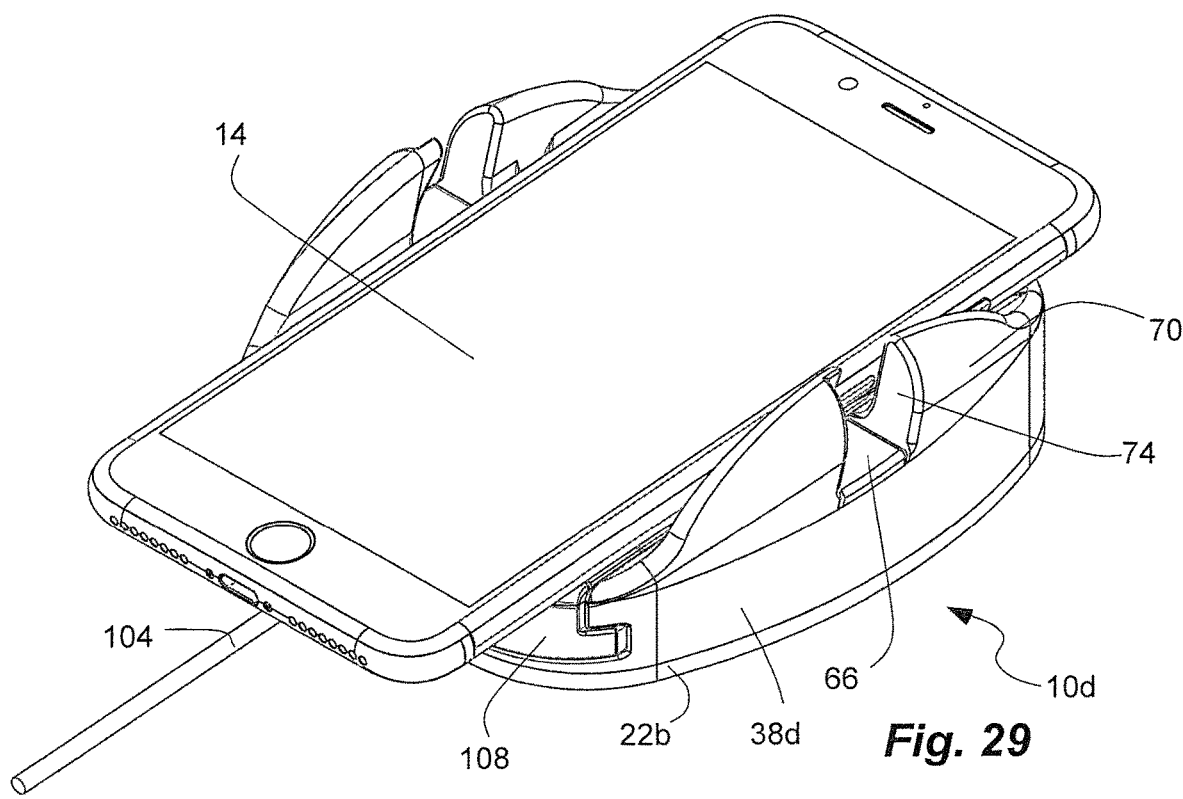
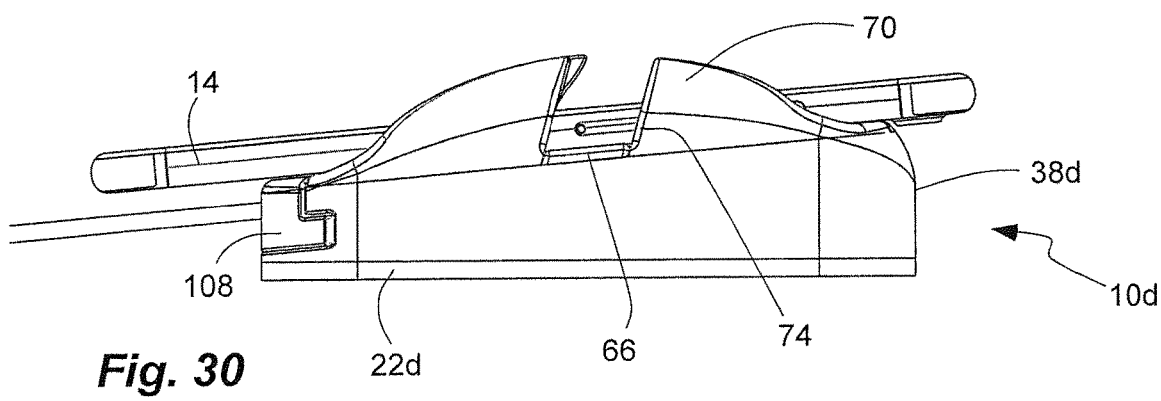

GRIP PAD

BACKGROUND

Mobile devices, such as cell phones, are typically carried by a user in a vehicle. Such cell phones can be placed on seats or dashboards while driving. Movement of the vehicle can cause the cell phones to move, causing damage to the cell phone and/or distracting the driver. The development of cell phone and auto accessories is an ongoing endeavor.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein:

FIG. 1a is a perspective view of a grip pad in accordance with an embodiment of the invention.

FIG. 1b is a perspective view of the grip pad of FIG. 1a, shown in a conformal configuration.

FIG. 3a is a side view of the grip pad of FIG. 1a.

FIG. 5 is a top view of the grip pad of FIG. 1a.

FIG. 7 is an exploded perspective view of the grip pad of FIG. 1a.

FIG. 8 is an exploded side view of the grip pad of FIG. 1a.

FIG. 12 is a top view of the grip pad of FIG. 9a.

FIG. 13 is a front view of the grip pad of FIG. 9a.

FIG. 14a is a side view of the grip pad of FIG. 9a.

FIG. 15 is an exploded perspective view of the grip pad of FIG. 9a.

FIG. 16 is an exploded side view of the grip pad of FIG. 1a.

FIG. 17a is a perspective view of another grip pad in accordance with an embodiment of the invention, shown with a wireless charger.

FIG. 17b is a perspective view of the grip pad of FIG. 17a, shown in the conformal configuration.

FIG. 18 is a perspective view of the grip pad of FIG. 17a, shown with the mobile device thereon.

FIG. 19a is a side view of the grip pad of FIG. 17a, shown with the mobile device thereon.

FIG. 19b is a side view of the grip pad of FIG. 17a, shown in the conformal configuration.

FIG. 20 is a top view of the grip pad of FIG. 17a.

FIG. 22 is an end view of the grip pad of FIG. 17a.

FIG. 24 is an exploded perspective view of the grip pad of FIG. 17a.

FIG. 25 is an exploded side view of the grip pad of FIG. 17a.

FIG. 29 is a perspective view of the grip pad of FIG. 26a, shown with the mobile device thereon in the portrait and the reclined orientation.

FIG. 30 is a side view of the grip pad of FIG. 26a, shown with the mobile device thereon in the portrait and the reclined orientation.

FIG. 33 is a perspective exploded view of the grip pad of FIG. 26a.

Figure 2A:
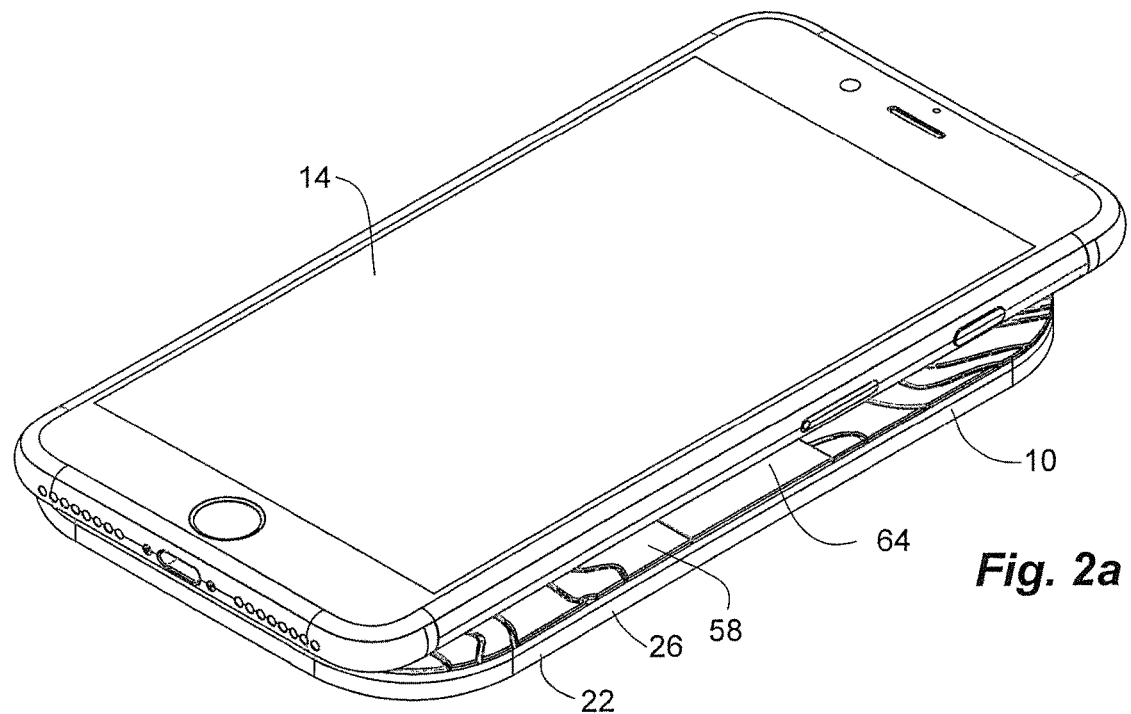
FIG. 2a is a perspective view of the grip pad of FIG. 1a, shown with a mobile device thereon.
Figure 2B:
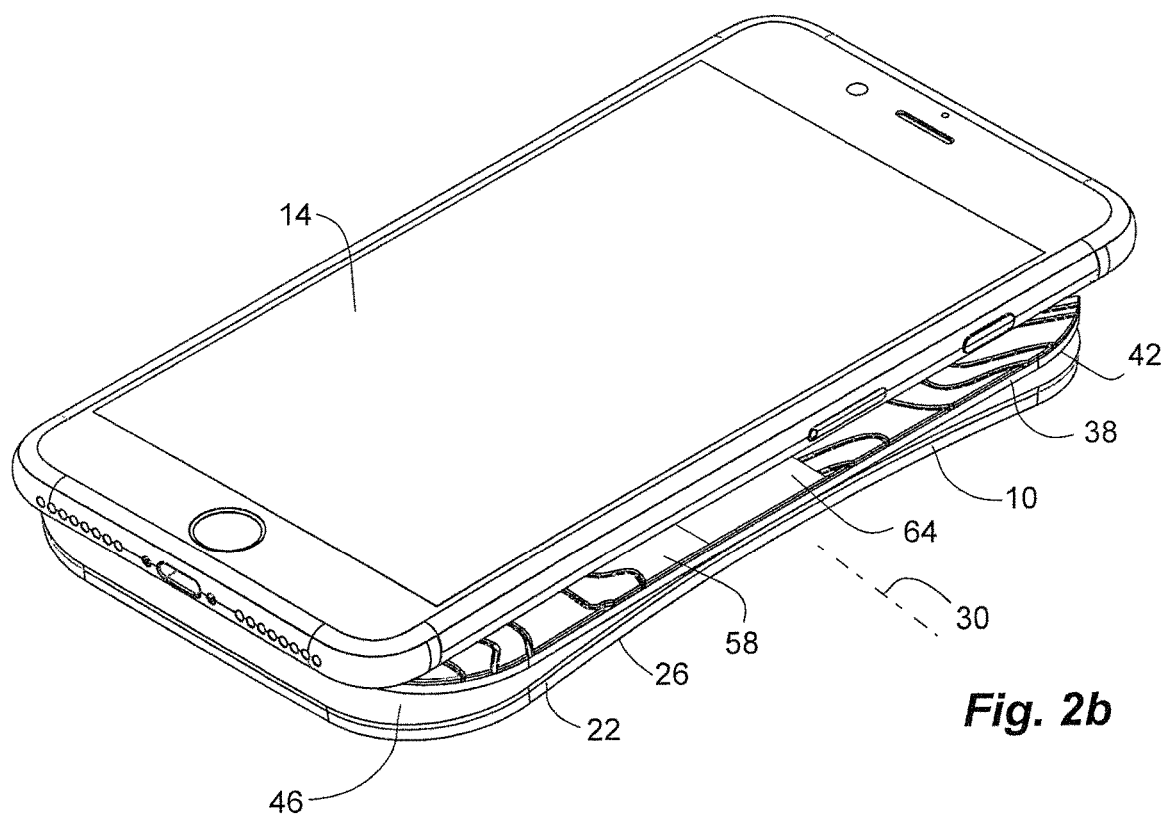
FIG. 2b is a perspective view of the grip pad of FIG. 1a, shown with the mobile device thereon and in the conformal configuration.
Figure 3A:
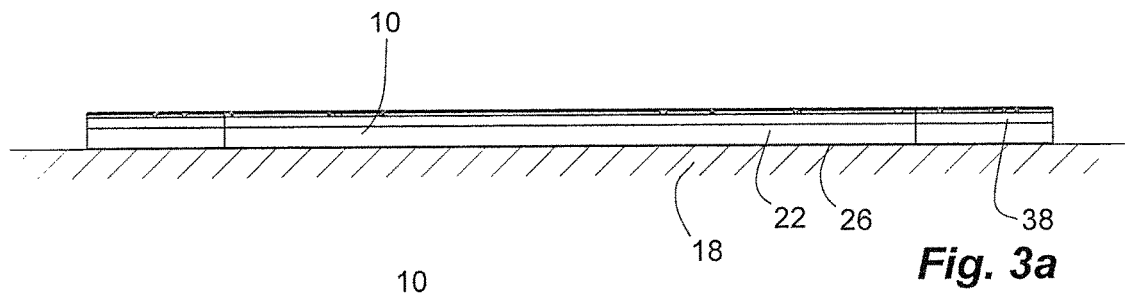
Figure 3B:
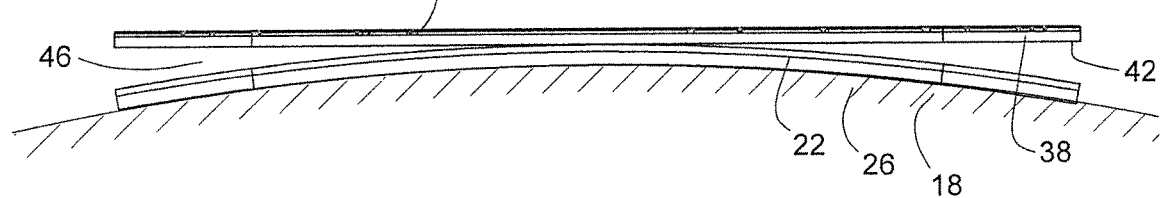
FIG. 3b is a side view of the grip pad of FIG. 1a, shown in the conformal configuration.
Figure 4A:
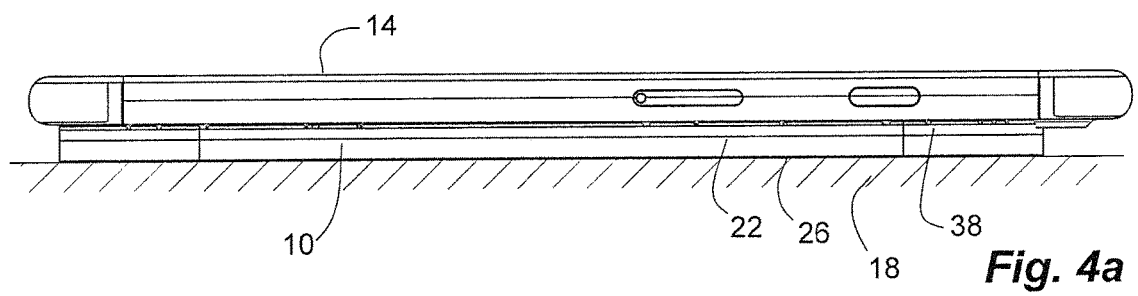
FIG. 4a is a side view of the grip pad of FIG. 1a, shown with the mobile device thereon.
Figure 4B:
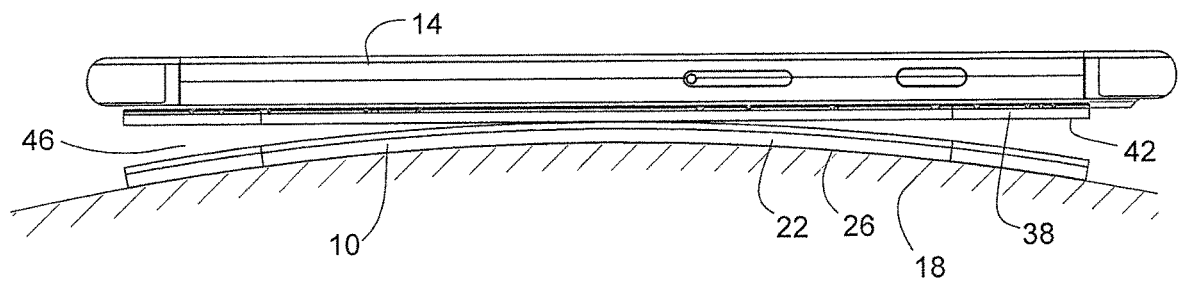
FIG. 4b is a side view of the grip pad of FIG. 1a, shown with the mobile device thereon and in the conformal configuration.
Figure 5:
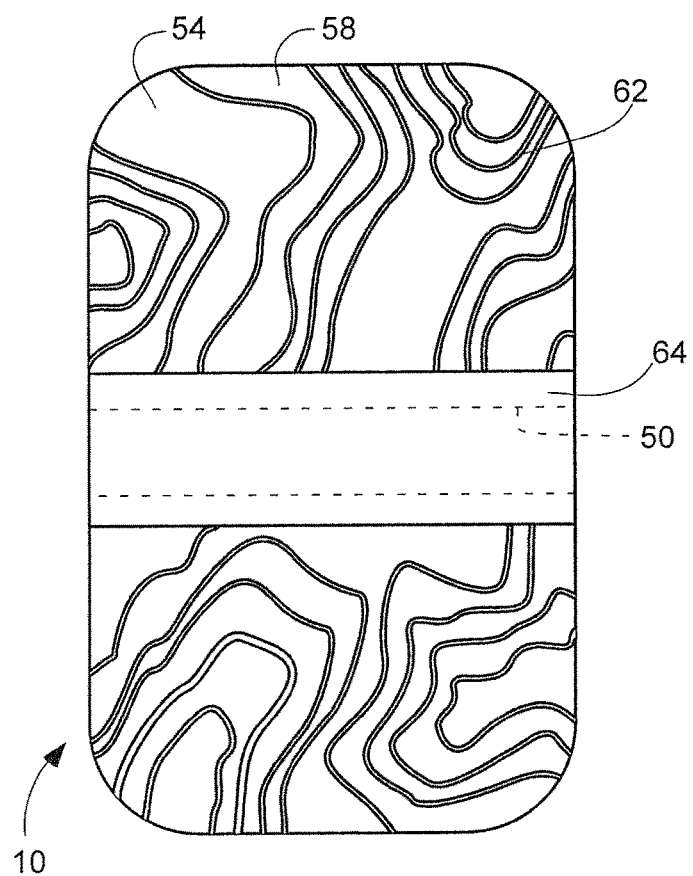
Figure 6:
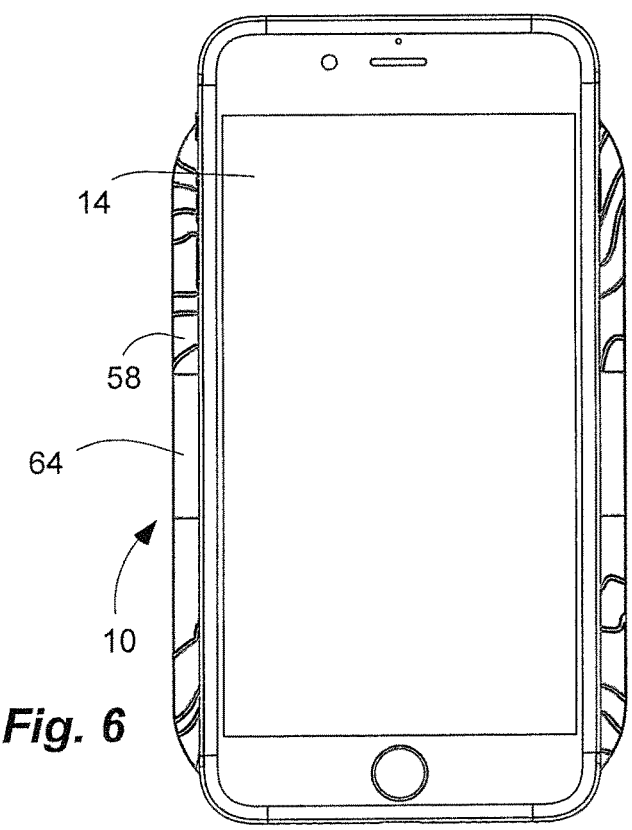
FIG. 6 is a top view of the grip pad of FIG. 1a, shown with the mobile device thereon.
Figure 7:
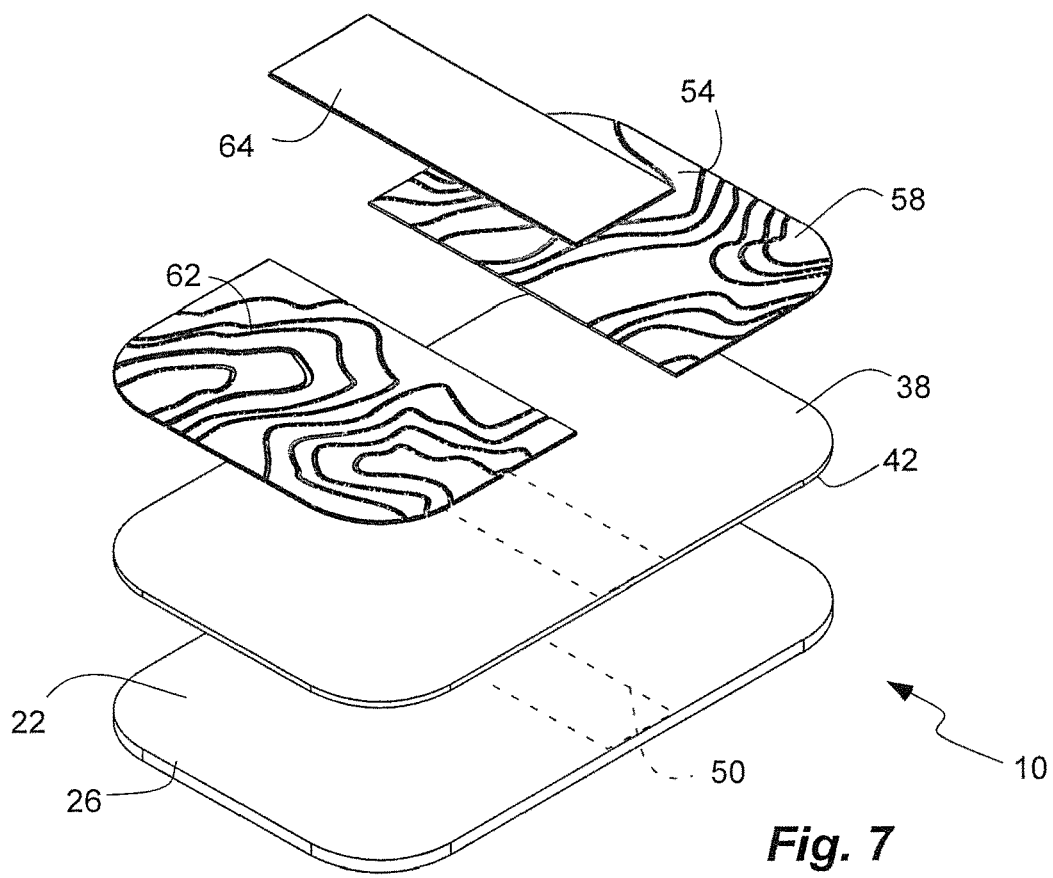
Figure 8:
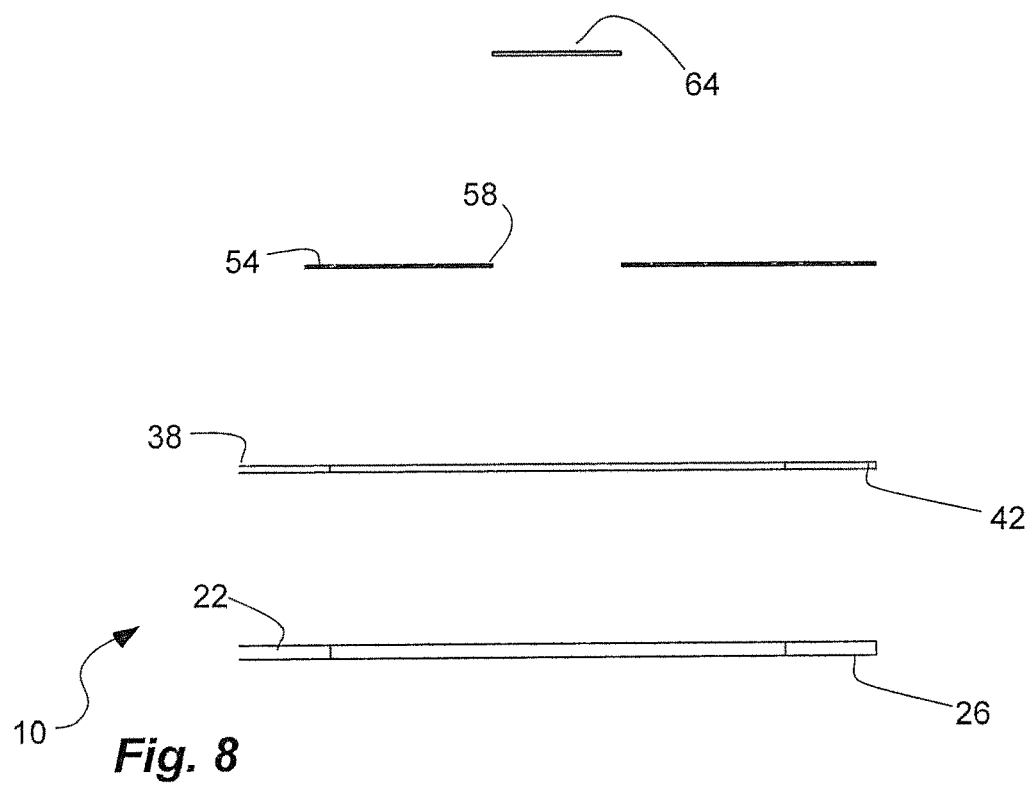
Figure 9A:
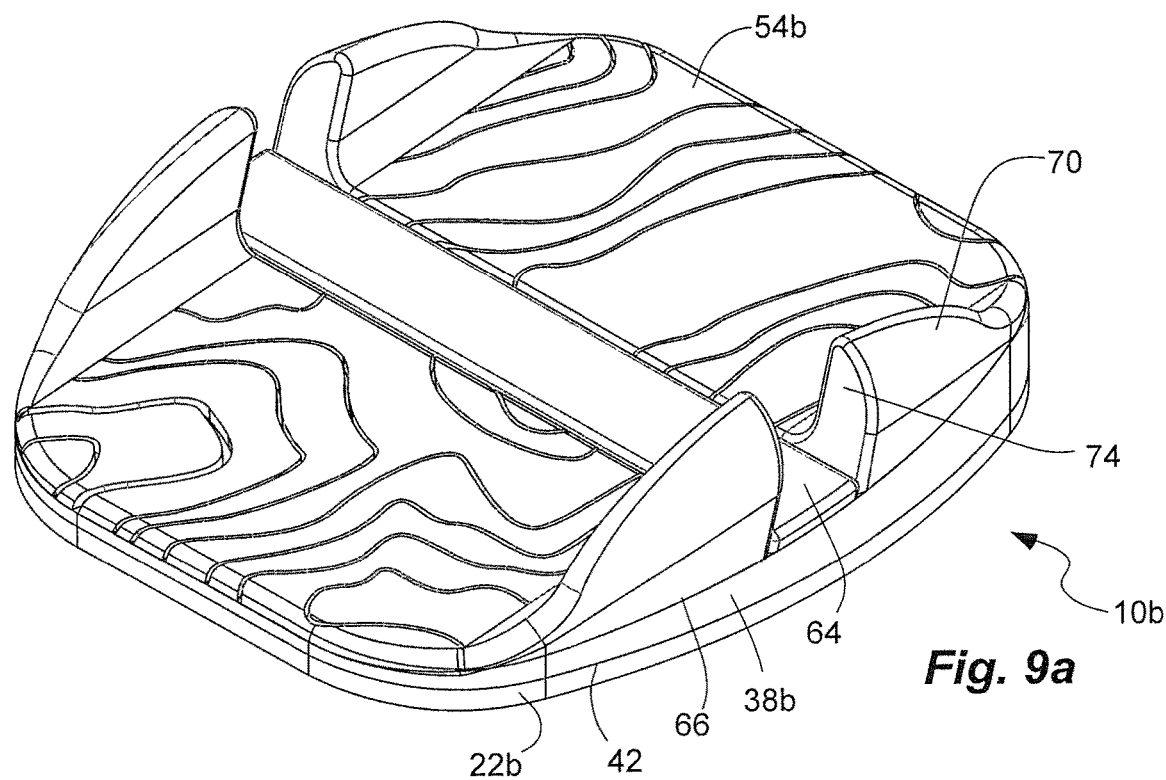
FIG. 9a is a perspective view of another grip pad in accordance with an embodiment of the invention.
Figure 9B:
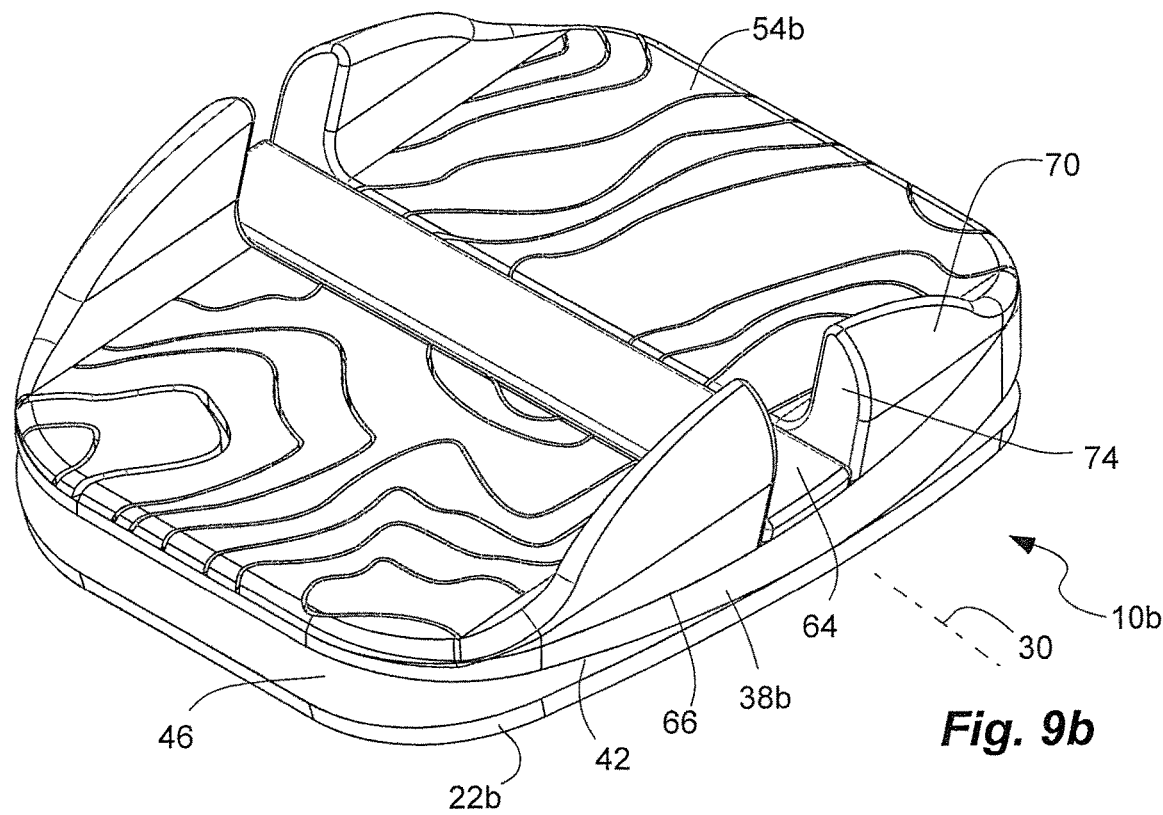
FIG. 9b is a perspective view of the grip pad of FIG. 9a, shown in a conformal configuration.

Reference will now be made to the exemplary embodiments illustrated, and specific language will be used herein to describe the same. It will nevertheless be understood that no limitation of the scope of the invention is thereby intended.

DETAILED DESCRIPTION

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

As used herein, "adjacent" refers to the proximity of two structures or elements. Particularly, elements that are identified as being "adjacent" may be either abutting or connected. Such elements may also be near or close to each other without necessarily contacting each other. The exact degree of proximity may in some cases depend on the specific context.

The terms "mobile device" and "cell phone" are used interchangeably herein, unless otherwise specified, to refer to a portable handheld electronic device, such as a cellular or cell phone, tablet or tablet computer, phablet, game, GPS, and the like, with a display screen, and that is portable and handheld. The display screen can be a touch screen that can receive input by touch such as finger swipes, and/or can have a virtual keyboard. The mobile device can have a battery and memory and a processor with software running thereon. The mobile device can have cellular, WiFi and/or Bluetooth connectivity, and can have a wireless transmitter, receiver, or transceiver. Thus, the mobile device can provide Internet browsing, game playing, movie and picture display, e-book display, etc. In addition, the mobile device can include a digital camera. Throughout the description, the term "cell phone" will be used as an example of the mobile device, and such use of the term "cell phone" includes all mobile devices or portable handheld electronic devices, unless otherwise specified.

The term "tacky" is used herein to refer to a non-adhesive, non-slip type cling. Such a cling can be described as mechanical and/or specific adhesion. Such a cling is without chemical adhesive that dries or cures such that the cling can be overcome by hand force without altering the surfaces.

An initial overview of the inventive concepts are provided below and then specific examples are described in further detail later. This initial summary is intended to aid readers in understanding the examples more quickly, but is not intended to identify key features or essential features of the examples, nor is it intended to limit the scope of the claimed subject matter.

The invention presents a grip pad to hold items, such as a mobile device or cell phone, to a support surface, such as a dashboard of a vehicle. The grip pad can have a tacky bottom surface to releasably cling to the dashboard, and a tacky top surface to releasably cling to the cell phone. In addition, the grip pad can conform to a contour of the dashboard. For example, the grip pad can have a bottom layer that is flexible to bend to an arcuate shape to match the dashboard. The top surface, meanwhile, can remain flat. An intermediate layer can be sandwiched between the bottom layer and a top layer, and can be rigid to maintain the top layer in a planar configuration. A fixed portion of the bottom layer may be affixed to the intermediate layer by a strip or patch, while the remaining bottom layer can be a free portion to move away from the intermediate layer so as to conform to the support surface.

In one aspect, the pad can have a top surface that can be inclined with respect to the bottom surface and the dashboard. The pad can have a wedge shape formed by an intermediate layer being a wedge. In addition, lateral side walls can extend beyond the top surface of opposite lateral sides. Slots can be formed in the walls at an incline to support the cell phone in a landscape orientation at an incline between the lateral side walls. The wedge can also have a pocket with a wireless charger therein to charge the cell phone.

Referring to FIGS. 1a-8, a grip pad, indicated generally at 10, in an example implementation in accordance with an embodiment of the invention is shown for holding and griping items on a support surface. In one aspect, the item can be a cell phone 14 and the support surface can be a dashboard 18 of a vehicle. Thus, the grip pad 10 can grip and cling to the cell phone 14 and the dashboard 18 to secure the cell phone 14 with respect to the dashboard 18. The grip pad 10 can resist movement of the cell phone 14 as the vehicle moves, thus resisting damage to the cell phone. In addition, the grip pad 10 can present and orient the cell phone 14 for use, such as to display a map. Furthermore, the grip pad 10 can provide charging to the cell phone 14, such as with a wireless charger.

The grip pad 10 can comprise a stack of layers, with each of the layers performing a function and providing a feature or characteristic of the pad. In one aspect, all of the layers in the stack can have perimeters that are aligned with one another. Thus, the layers can have the same perimeter size and shape. In another aspect, the layers can have different thicknesses and different materials with respect to one another. In another aspect, all of the layers can remain in their respective layer, without extending into another contiguous layer.

The grip pad 10 can comprise a base or a base layer 22 with a bottom surface 26 disposed on the support surface 18. The base or the base layer 22 can have a constant thickness between the bottom surface 26 and the top thereof. The base layer 22 can remain in its respective layer without extending into a contiguous layer.

The base layer 22 can comprise a tacky material and the bottom surface 26 is tacky to cling to and grip the dashboard 18. In one aspect, the base layer 22 can be formed of, or can comprise, a silicone composite material. In another aspect, the base layer 22 can be formed of, or can comprise, a polyurethane material.

The base layer 22 can also be flexible and can substantially conform to a contour of the support surface 18. The base layer 22 can bend and flex between: 1) a flat configuration (FIGS. 1a, 2a, 3a and 4a), and 2) a non-flat or contoured configuration (FIGS. 1b, 2b, 3b and 4b). In the flat configuration, the base layer 22 and the bottom surface 26 are planar and flat. Thus, the base layer 22 and the bottom surface 26 can sit flush on a flat or planar support surface or dashboard. In the non-flat or contoured configuration, the base layer 22 and the bottom surface 26 are non-planar. For example, the base layer 22 and the bottom surface 26 can be arcuate, curved, arched, bent, bowed, and/or curled. Thus, the base layer 22 and the bottom surface 26 can sit flush on a curved or contoured support surface or dashboard 18. In one aspect, the base layer 22 and the bottom surface 26 can bend about a single axis, such as a lateral axis 30. In another aspect, the bottom surface 26 can bend about a pair of axes, such as the lateral axis 30, and a longitudinal axis 34, that can be perpendicular or orthogonal to the lateral axis 30. Thus, the base later 22 can form a concave indentation or inverted bowl to conform to an opposite shape of the dashboard.

In addition, the grip pad 10 can comprise a rigid intermediate layer 38. The intermediate layer 38 can be carried by the base layer 22. In one aspect, the intermediate layer 38 can be disposed on and contiguous with the base layer 22.

The intermediate layer 38 can be rigid, and can remaining rigid even when the base layer 22 is in the non-planer or contoured configuration. In one aspect, the intermediate layer can comprise or can be formed of acrylonitrile butadiene styrene (ABS).

In addition, the intermediate layer 38 can have a bottom 42 that can remain planar even when the base layer 22 is in the arcuate configuration. A gap 46 can be defined between the intermediate layer 38, or bottom 42 thereof, and the base layer 22 when the base layer 22 is in the non-flat or contoured configuration. In one aspect, the intermediate layer 38 can be planar, and can have a constant thickness. In another aspect, the intermediate layer 38 can remain in its respective layer without extending into a contiguous layer, such as the base layer 22.

A portion of the intermediate layer 38 and the base layer 22 can be coupled to one another. Thus, the intermediate layer 38, or the bottom 42 thereof, can have an attachment portion, while the base layer 22, or top thereof, can have an attachment portion contiguous with the attachment portion of the intermediate layer 38. The contiguous attachment portions can define an attachment strip 50 (FIG. 5) or spot. The remaining portions can be free portions that are free from one another and free to separate from one another. The free portions can be contiguous, but unattached, in the flat configuration of the base layer 22, and separated from one another by the gap 46 in the non-flat or contoured configuration of the base layer 22. The gap 46 can have a variable thickness. In one aspect, the gap 46 can be thicker at the perimeter of the layers 22 and 38, and thinner at the attachment strip 50 or spot. In one aspect, the attachment strip 50 can be a lateral attachment band extending laterally across the layers 22 and 38 from one lateral side to another. The attachment strip 50 can be intermediate, such as at a midpoint between, the front and rear ends of the layers 22 and 38. In one aspect, at least 10% of the flexible base 22 is attached to the intermediate layer 38. Thus, the movement of the intermediate layer 38 with respect to the base layer 22 in the non-flat or contoured configuration. In another aspect, the attachment strip 50 or spot can be circumscribed by the layers 22 and 38 to allow lateral sides of the base layer 22 to separate from the intermediate layer 38 to further allow the base layer 22 to conform to the support surface.

Furthermore, the grip pad 10 can comprise a top layer 54. The top layer 54 can be carried by and contiguous with the intermediate layer 38. The top layer 54 has a top surface 58 to selectively receive the mobile device or cell phone 14 thereon. While the base layer 22 can be flexible, and the intermediate layer 38 can be rigid, the top layer 54 can be semi-rigid, i.e. less rigid than the intermediate layer 38 and more rigid than the base layer 22. Thus, the top layer 54 and the top surface 58 can resist marring the mobile device or cell phone 14. The top layer 54 and the top surface 58, or a major portion thereof, can remain planar and flat. The intermediate layer 38 can maintain the top layer 54 planar and flat. Thus, the top surface 58 can be adapted to receive the cell phone 14. The top layer 54, or the major portion thereof, can have a constant thickness between the top surface 58 and the bottom thereof. The top layer 54 can remain in its respective layer without extending into a contiguous layer, such as the intermediate layer 38. Similarly, the intermediate layer 38 can remain in its respective layer without extending into a contiguous layer, such as the top layer 54.

The top layer 54 can be formed of, or can comprise, a tacky material and the top surface 58 can be tacky. The tacky surface 58 can cling to the cell phone 14 to resist displacement of the cell phone 14 with respect to the grip pad 10, and thus the dashboard 18 and vehicle, as the vehicle travels. In one aspect, the top layer 54 can be formed of or can comprise thermoplastic polyurethane (TPU), thermoplastic rubber (TPR), or thermoplastic elastomer (TPE). In another aspect, the top layer 54 can be formed of or can comprise a polyurethane material. Thus, the top layer 54 can be semi-rigid and tacky. Therefore, the base, intermediate and top layers 22, 38 and 54 are each formed from a different material with respect to the others.

In one aspect, the top layer 54 can comprise apertures 62 therein. The apertures 62 can provide a textured surface to further resist displacement of the cell phone 14 thereon. In another aspect, the apertures 62 can extend to the intermediate layer 38 with the intermediate layer 38 visible through the apertures 62. The intermediate layer 54, or top thereof, can have a contrasting or different color than the top layer 54 to accentuate the textured surface and provide confidence of the non-slip nature of the top surface 58.

In another aspect, the top layer 54 can be bifurcated into two separate portions. For example, the top layer 54 can be laterally bifurcated, as shown, and separated into front and rear portions separated by a gap. A tacky insert 64 can be disposed in the gap between the two portions of the top layer 54. In one aspect, the tacky insert 64 can fill and span the gap. The tacky insert 64 can be formed of, or can comprise, a tacky material and a top thereof can be tacky. In one aspect, a top of the tacky insert 64 can be flush with the top surface 58 of the top layer 54. In another aspect, the top of the tacky insert 64 can extend above, and can be elevated above, the top surface 58 of the top layer 54 to insure contact with the cell phone 14. The top of the tacky insert 64 can cling to the cell phone 14 to resist displacement of the cell phone 14. In one aspect, the tacky insert 64 can be formed of, or can comprise, a silicone composite material, like the base layer 22. In another aspect, the tacky insert 64 can be formed of, or can comprise, a polyurethane material.

Referring to FIGS. 9a-16, another grip pad 10b is shown that is similar in many respects to that described above, and which description is incorporated herein by reference. The grip pad 10b can be configured to provide multiple holding orientations for the cell phone 14. As described above, the grip pad 10b can have a base layer 22b and a top layer 54b.

In addition, the grip pad 10b can comprise an intermediate layer 38b with a variable thickness. In one aspect, the thickness of the intermediate layer 38b can vary from the front end to the rear end, defining a wedge. The intermediate layer 38b and the wedge can have a top 66 at an acute angle with respect to the bottom 42. Thus, the intermediate layer 38b and the wedge can orient the top layer 54b at an acute angle with respect to the bottom layer 22. In one aspect, the acute angle can be between 3 and 10 degrees. In another aspect, the acute angle can be approximately 5 degrees. In one aspect, the front end can be thinner than the rear end so that the grip pad 10b is oriented to face forwardly.

Figure 10A:
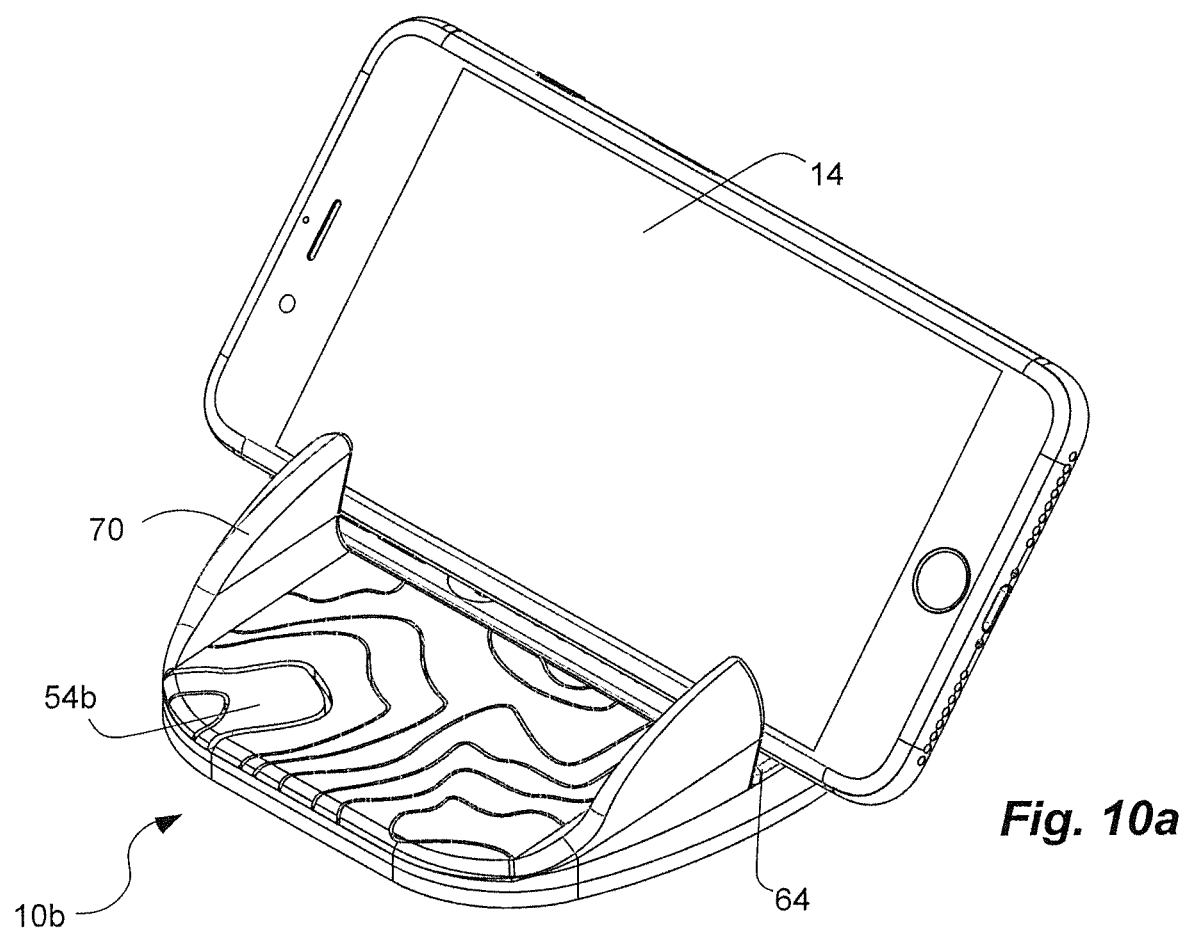
FIG. 10a is a perspective view of the grip pad of FIG. 9a, shown with a mobile device in a landscape and an upright orientation.
Figure 10B:
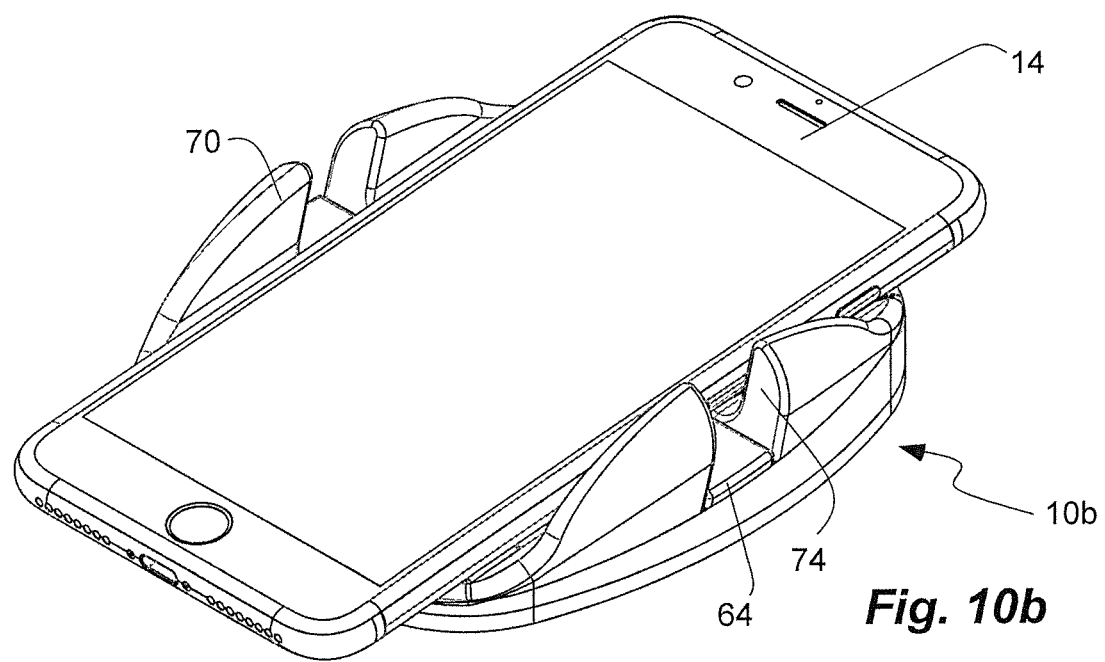
FIG. 10b is a perspective view of the grip pad of FIG. 9a, shown with the mobile device in a portrait and a relined orientation.
Figure 11A:
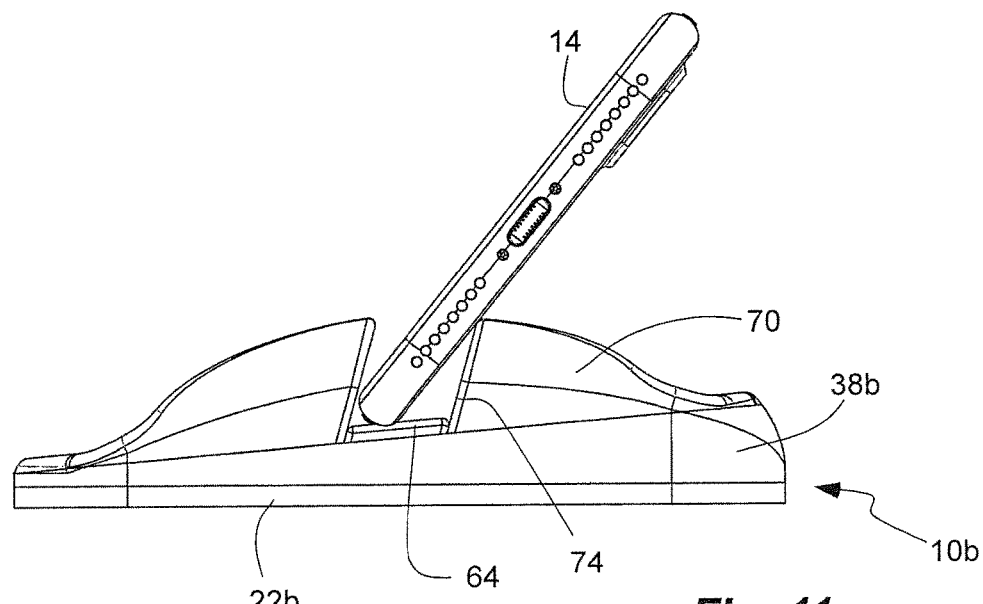
FIG. 11a is a perspective view of the grip pad of FIG. 9a, shown with a mobile device in a landscape and an upright orientation.
Figure 11B:
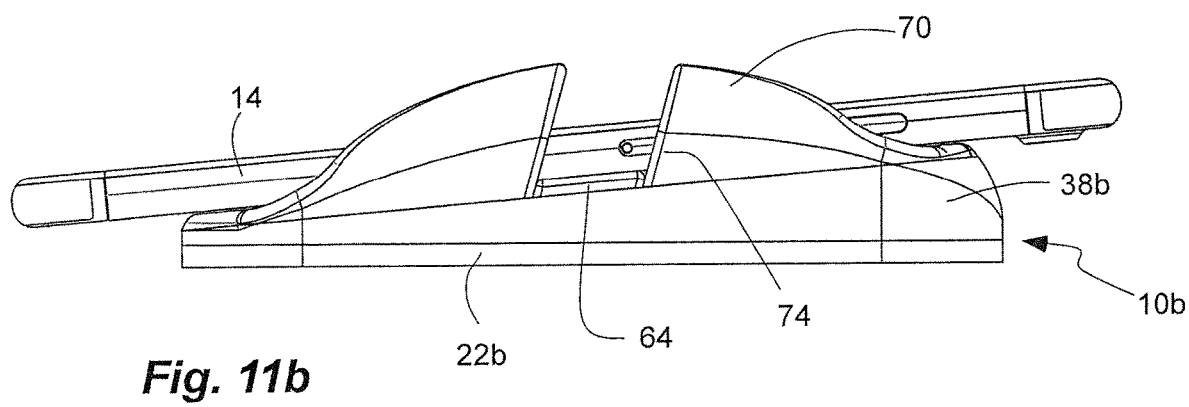
FIG. 11b is a perspective view of the grip pad of FIG. 9a, shown with the mobile device in a portrait and a relined orientation.
Figure 12:
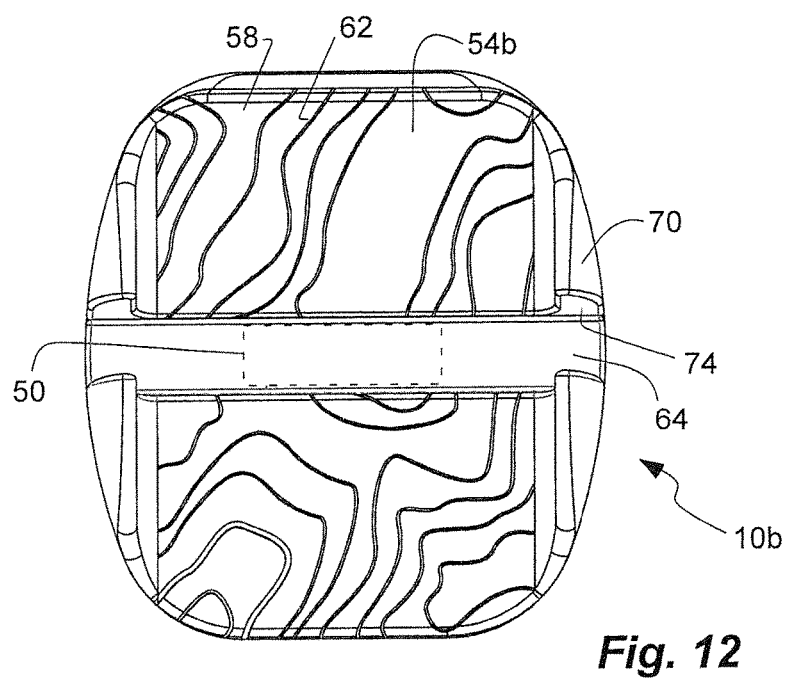
Figure 13:
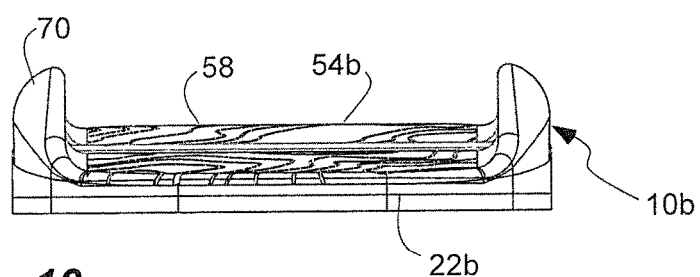
Figure 14A:
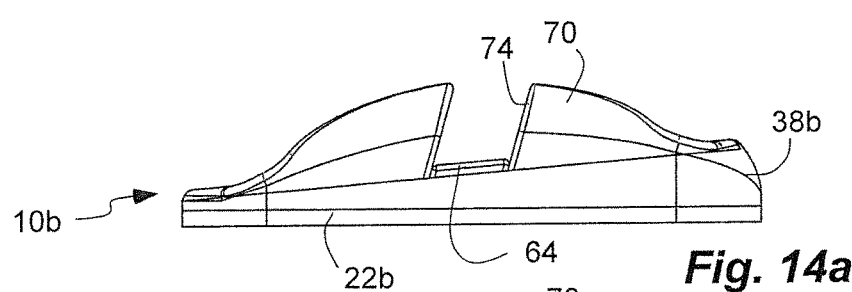
Figure 14B:
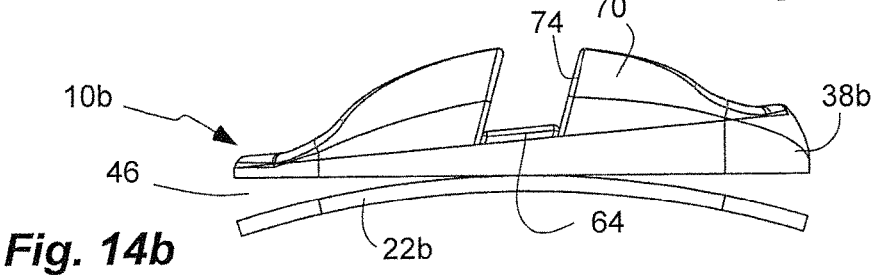
FIG. 14b is a side view of the grip pad of FIG. 9a, shown in the conformal configuration.
Figure 20:
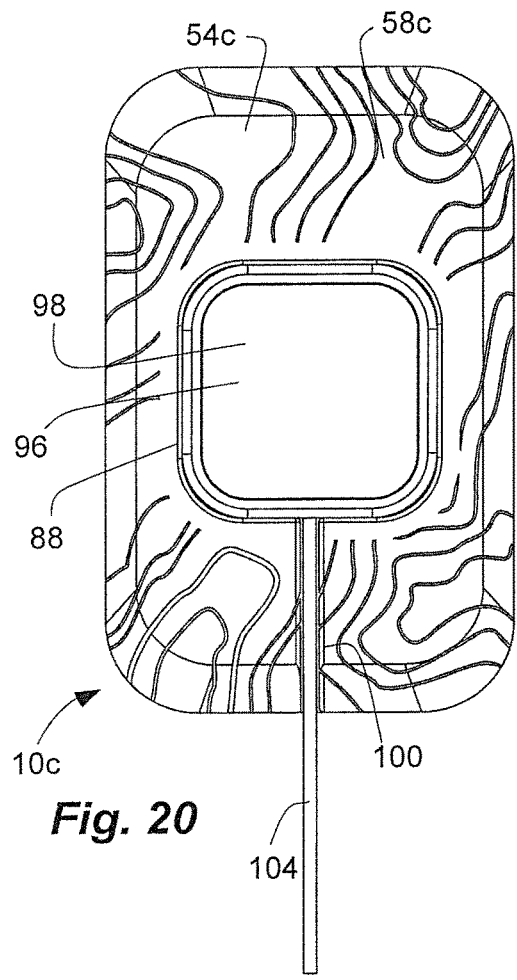
Figure 21:
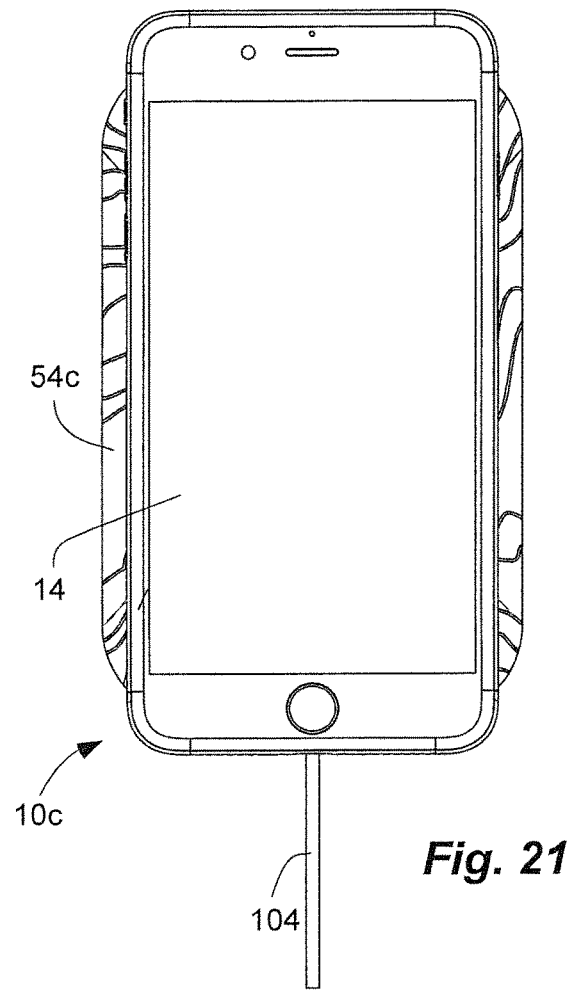
FIG. 21 is a top view of the grip pad of FIG. 17a, shown with the mobile device thereon.
Figure 22:
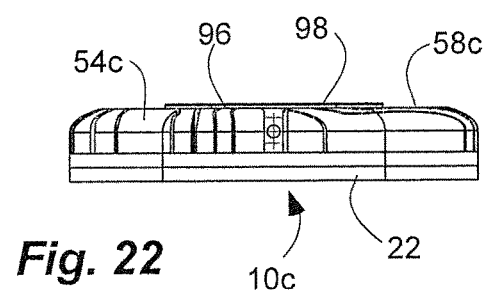
Figure 23:
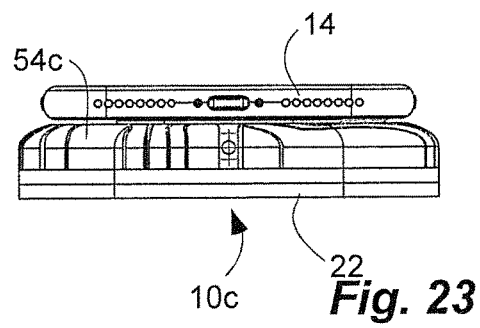
FIG. 23 is an end view of the grip pad of FIG. 17a, shown with the mobile device thereon.
Figure 24:
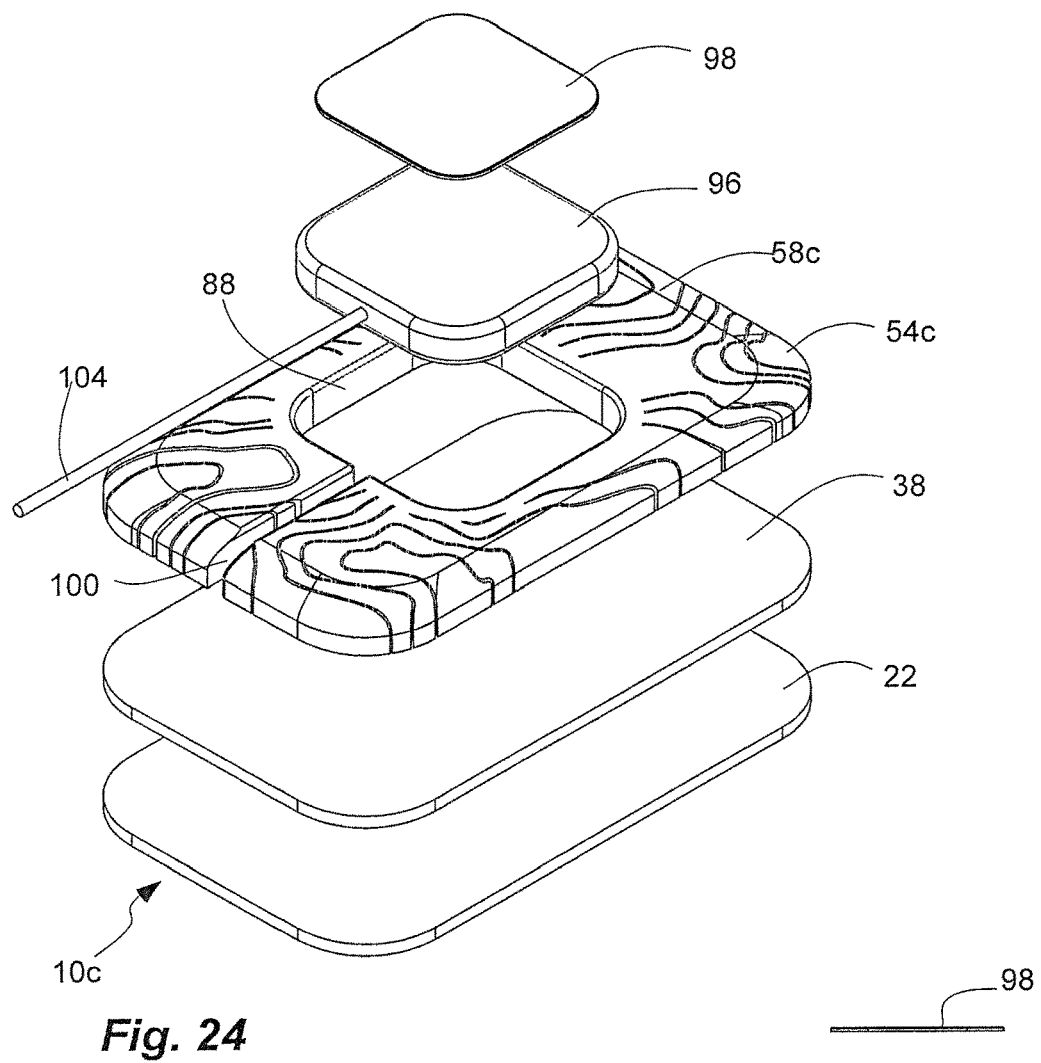
Figure 25:
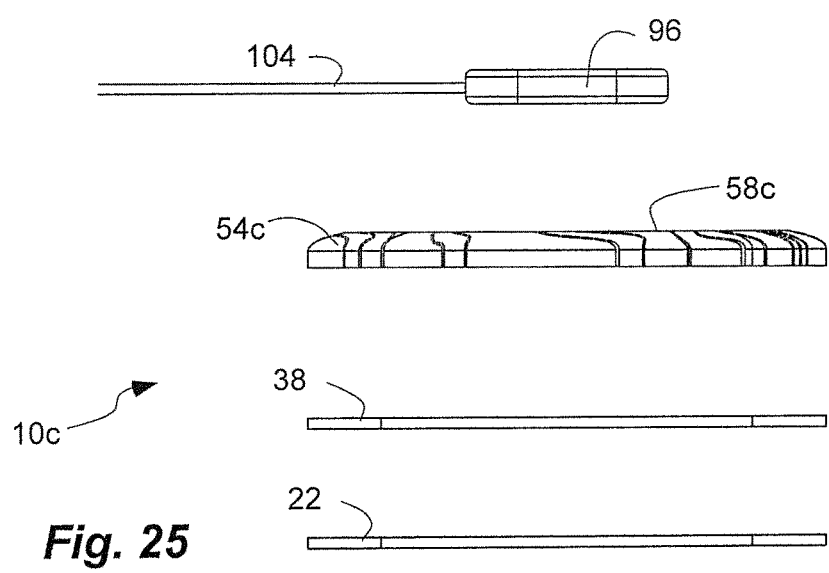
Figure 26A:
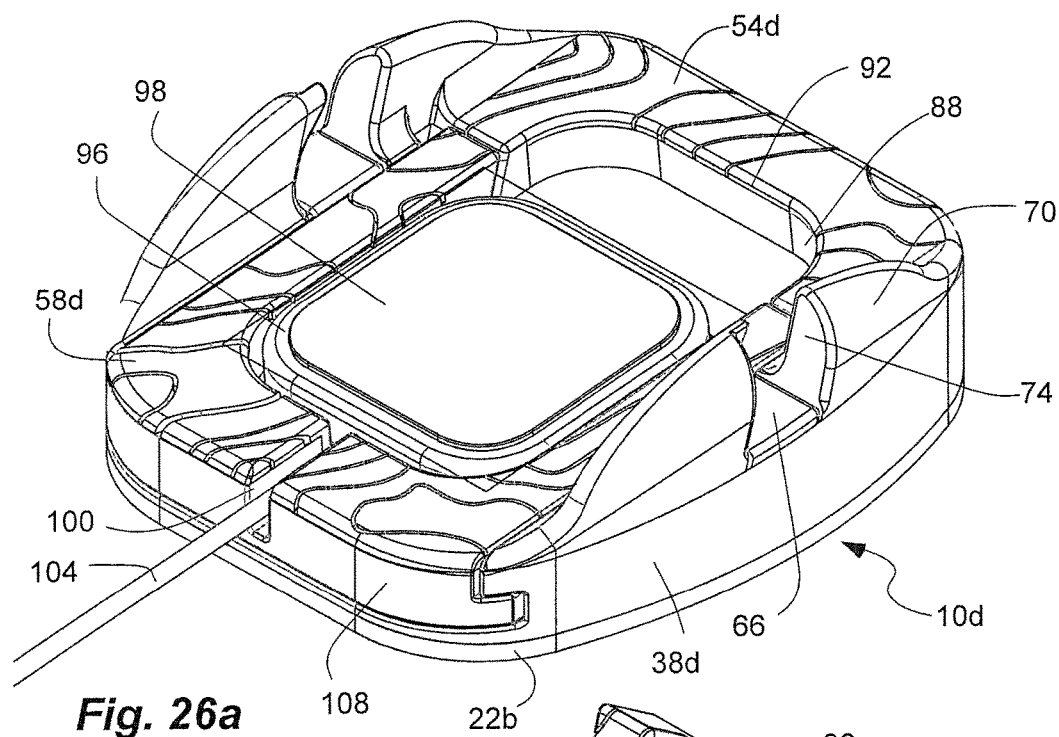
FIG. 26a is a perspective view of another grip pad in accordance with an embodiment of the invention, shown with a wireless charger in a first orientation.
Figure 26B:
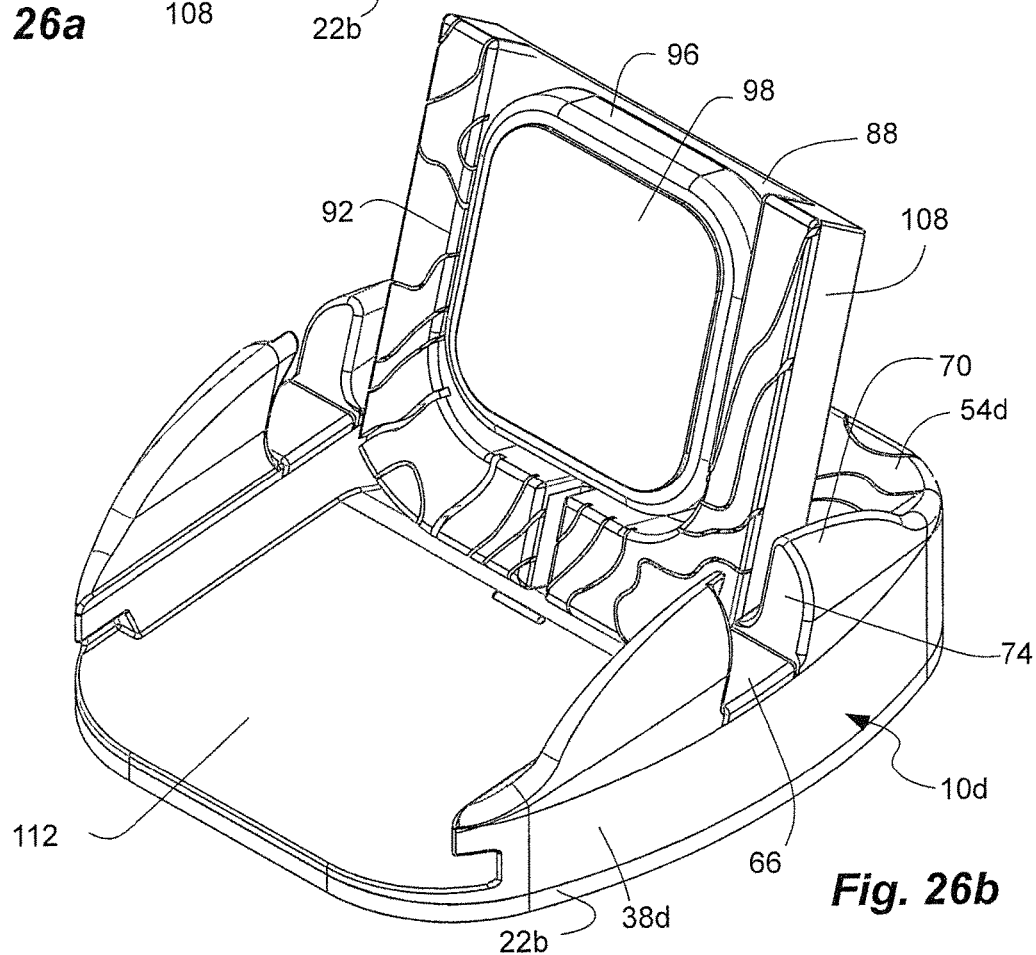
FIG. 26b is a perspective view of the grip pad of FIG. 26a, shown with the wireless charger in a second orientation.

In addition, the grip pad 10b can comprise raised lateral side walls 70 extending above the top layer 54b or the top surface 58b at lateral sides of the top layer 54b. In one aspect, the side walls 70 can be formed with the top layer 54b, and can comprise part of the top layer 54b. The cell phone 14 can be positioned in a portrait orientation and a reclined orientation on the top surface 58b of the top layer 54b, and between the side walls 70 with the side walls providing additional resistance to displacement of the cell phone 14, as shown in FIGS. 10b and 11b.

A slot 74 can be formed in each of the side walls 70 and aligned with one another. The cell phone 14 can be positioned in the slots in a landscape orientation and oriented at an incline to facilitate viewing the cell phone 14, such as when viewing a map, as shown in FIGS. 10a and 11a. The slots 74 can be inclined at an acute angle with respect to the top surface 58b. The acute angle between the slots 74 and the top surface 58b can be between 65 to 75 degrees in one aspect, and approximately 70 degrees in another aspect. The acute angle between the slots 74 and the bottom surface 26 in the flat configuration can be between 70 to 80 degrees in one aspect, and approximately 75 degrees in another aspect. In one aspect, the top layer 54b can be laterally bifurcated to form the slots 74 in each side wall 74. In addition, the bifurcated top layer 54b can extend laterally across the top layer 54b to form a channel between the two halves of the top layer 54b to receive the cell phone 14. Again, the tacky insert 64 can be disposed in the channel. When the cell phone 14 is positioned in the slots in the landscape orientation and the inclined orientation, the cell phone 14 can be positioned on the tacky insert 64.

Referring to FIGS. 17a-25, another grip pad 10c is shown that is similar in many respects to those described above, and which descriptions are incorporated herein by reference. The grip pad 10c can be configured to provide or to accommodate wireless charging for appropriately equipped mobile devices and cell phones.

The top layer 54c can have a cavity 88 formed therein. A wireless charger 96 can be disposed in the cavity 88 of the top layer 54c. The top layer 54c can be thicker than the bottom layer 22 and the intermediate layer 38 to accommodate the wireless charger 96. In one aspect, the cavity 88 can be a bore extending through the top layer 54c so that the wireless charger 96 is positioned on the intermediate layer 38.

In one aspect, the top or active surface of the wireless charger 96 can be flush with the top surface 58c. Thus, the cell phone 14 can be placed on the top surface 58c of the top layer 54c, and the top surface of the wireless charger 96.

In another aspect, the top or active surface of the wireless charger 96 can extend above the top surface 58c of the top layer 54c.

In another aspect, the wireless charger 96 itself can have a tacky top layer 98. In one aspect, the top of the tacky top layer 98 of the wireless charger 96 can be flush with the top surface 58c. Thus, the cell phone 14 can be placed on the top surface 58c of the top layer 54c, and the top of the tacky top surface 98. In another aspect, the top of the tacky top surface 98 of the wireless charger 96 can extend above the top surface 58c of the top layer 54c. A bore or channel 100 can be formed in the grip pad 10c and the top layer 54c to receive a power wire 104 for the wireless charger 96.

Referring to FIGS. 26a-33, another grip pad 10d is shown that is similar in many respects to those described above, and which descriptions are incorporated herein by reference. The grip pad 10d can be configured to provide multiple holding orientations for the cell phone 14, and to provide or to accommodate wireless charging for appropriately equipped mobile devices and cell phones 14.

Figure 32:
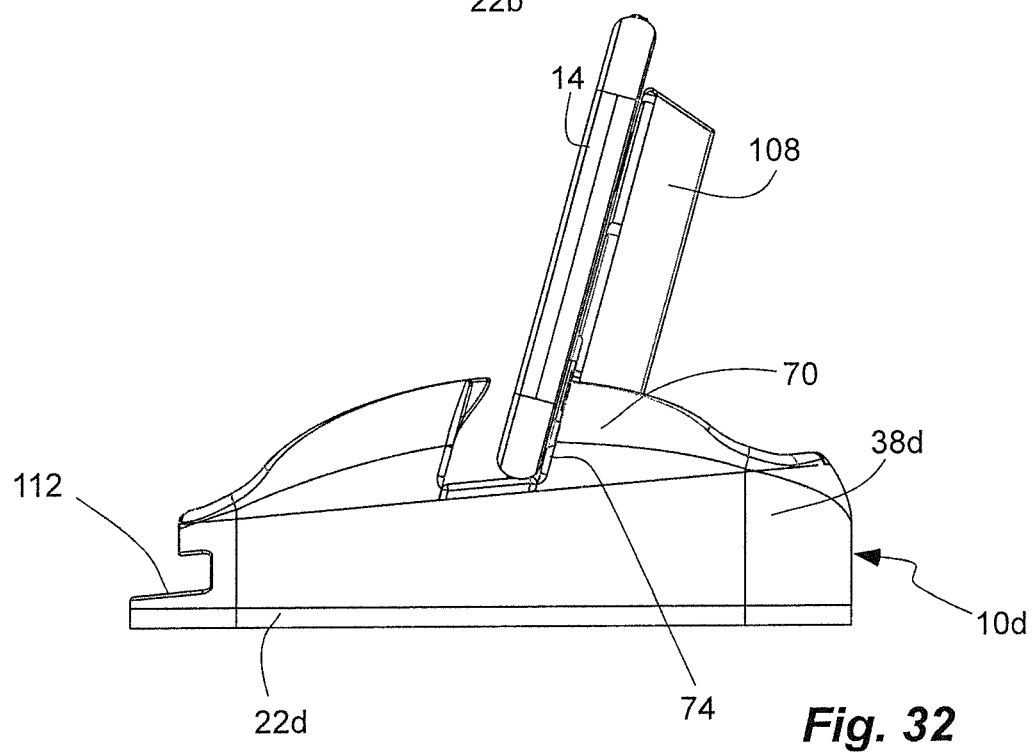
FIG. 32 is a side view of the grip pad of FIG. 26a, shown with the mobile device thereon in the landscape and the upright orientation.
Figure 33:
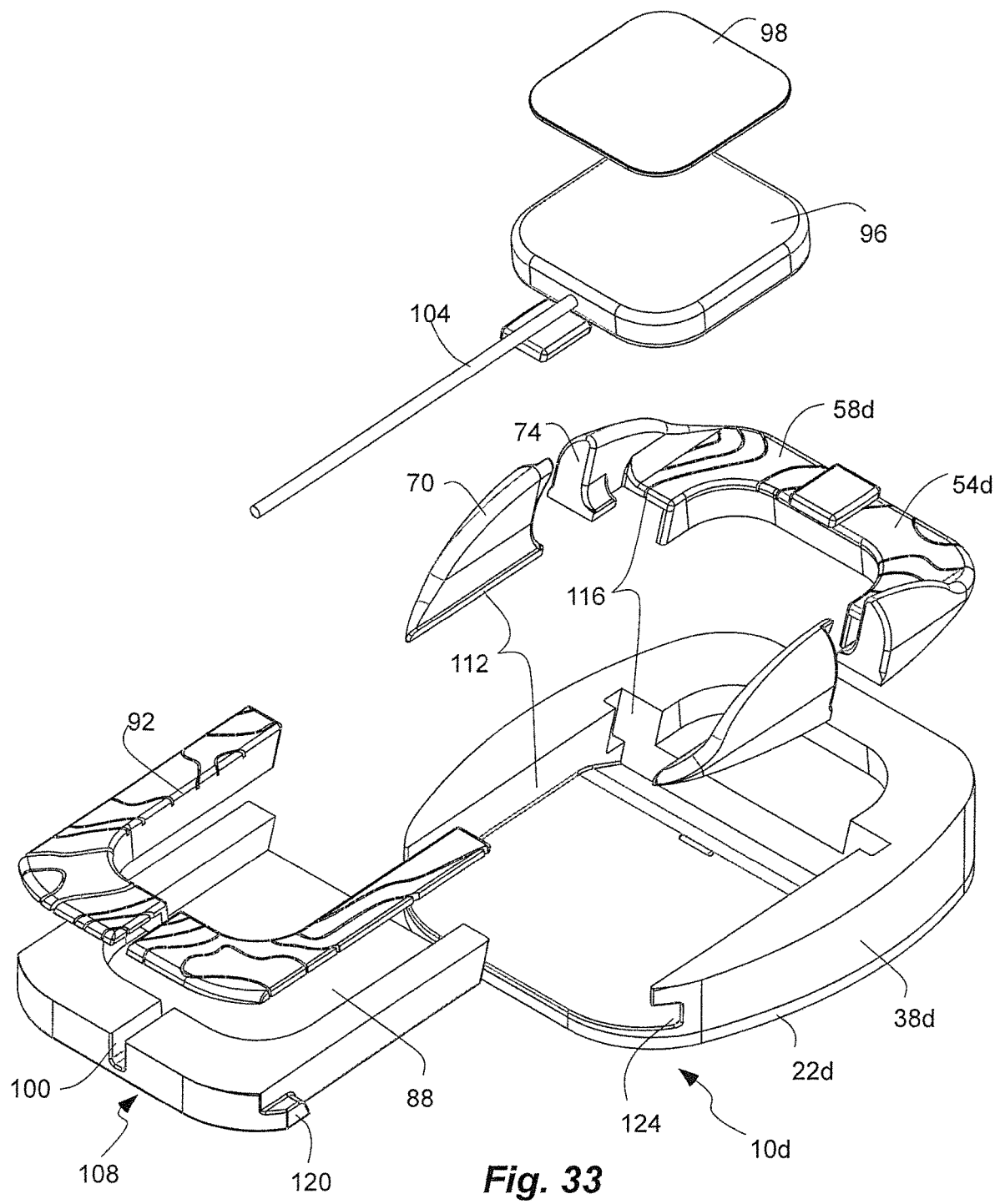

The intermediate layer 38d can have a cavity 88 formed therein, and the top layer 54d can have an aperture 92 extending therethrough to the cavity 88. A wireless charger 96 can be disposed in the cavity 88 of the intermediate layer 38c. In another aspect, the wireless charger 96 can be movable between: 1) a flat orientation (FIGS. 26a and 27), and 2) an upright orientation (26b and 32). In the flat orientation, the wireless charger 96 or active surface thereof can be substantially flush and parallel with the top surface 58c. In the upright orientation, the wireless charger 96 or active surface thereof can be substantially inclined with respect to the top surface 58d. In addition, the wireless charger 96 or active surface thereof can be substantially flush with the slots 74 in lateral side walls 70 in the upright orientation, as shown in FIG. 32.

In another aspect, the grip pad 10d can be reconfigurable, and can have a reconfigurable tray 108. The tray 108 can be removably and selectively positioned with respect to the grip pad 10d. The tray 108 can also be movable between the flat orientation and the upright orientation. In addition, the tray 108 can carry and contain the wireless charger 96 and all or some of the cavity 88. Thus, the repositioned the insert 108 repositions the wireless charger 96. The tray 108 can provide support to the wireless charger 96 in both the flat orientation and the upright orientation.

Figure 27:
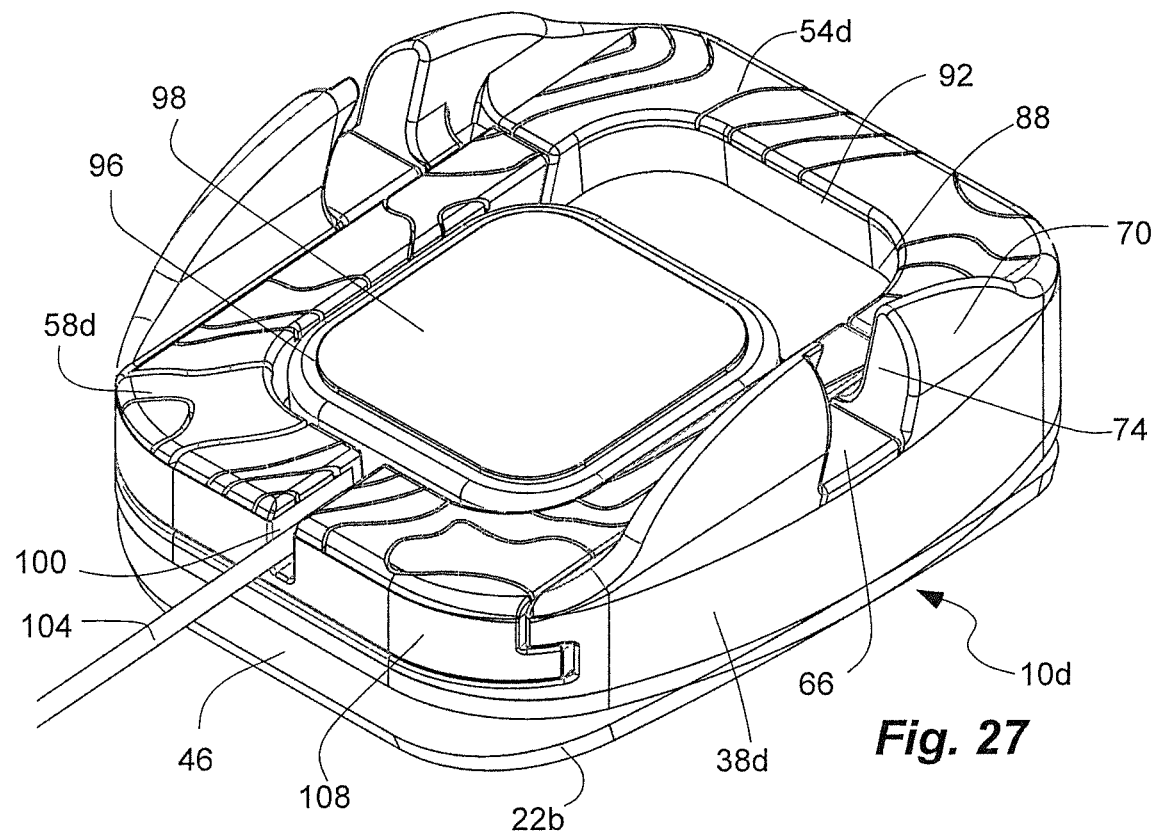
FIG. 27 is a perspective view of the grip pad of FIG. 26a, shown in the conformal configuration.
Figure 28:
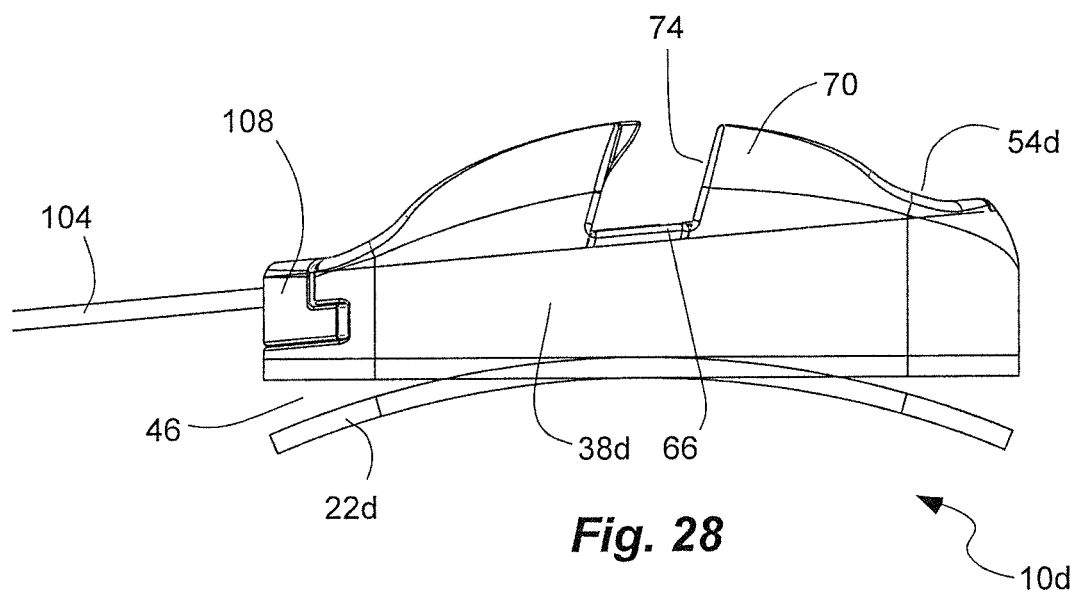
FIG. 28 is a side view of the grip pad of FIG. 26a, shown in the conformal configuration.
Figure 31:
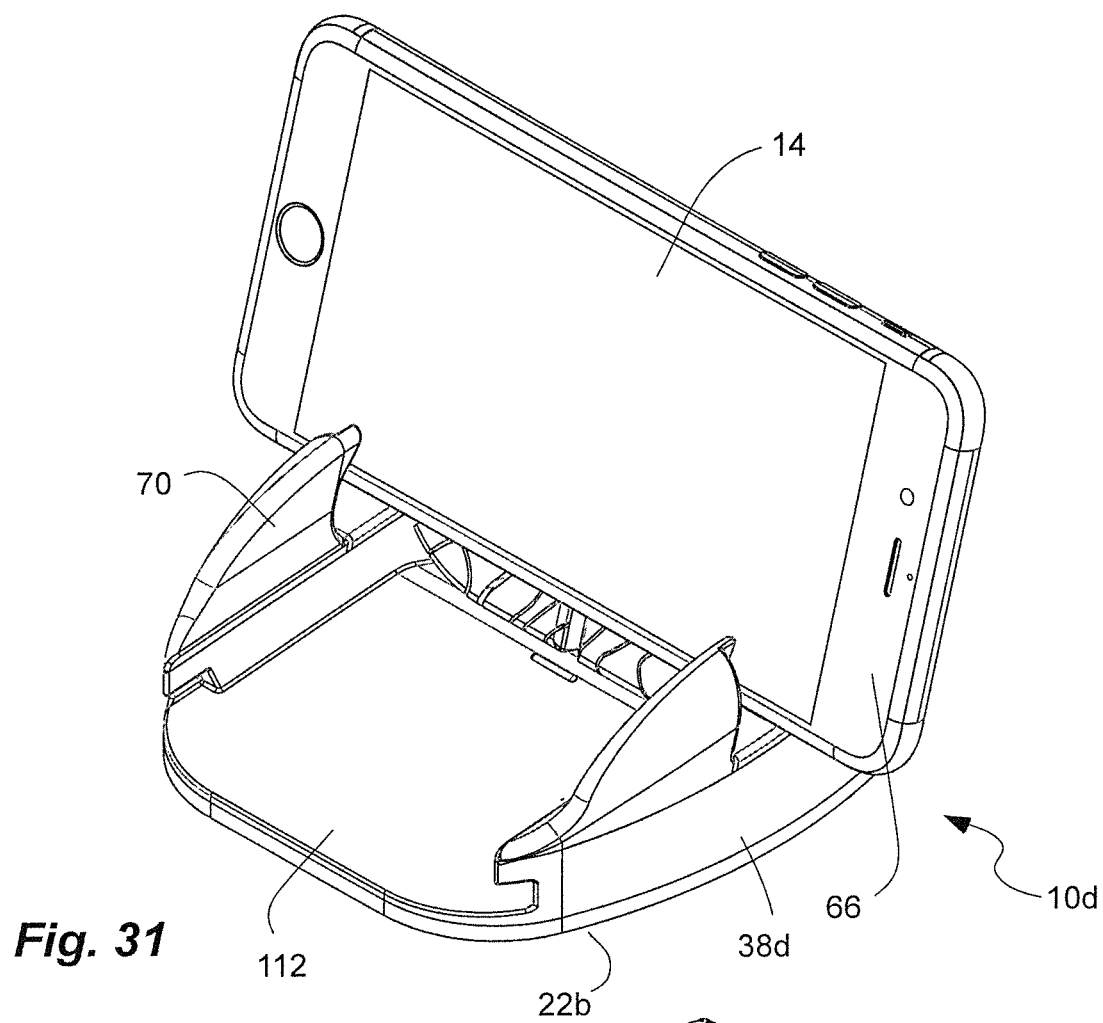
FIG. 31 is a perspective view of the grip pad of FIG. 26a, shown with the mobile device thereon in the landscape and the upright orientation.

The grip pad 10d, and the intermediate layer 38d and the top layer 54d, can have a horizontal slot 112 in the front and an inclined slot 116 in the top behind the slots 74 in the side walls 70 to selectively receive the insert 108. The horizontal slot 112 can be formed in both the intermediate layer 38d and the top layer 54d, and can extend horizontally from the front end of the grip pad 10d so that the tray 108 can be slid into the grip pad 10d from the front. The tray 108 can have tabs 120 extending laterally from and intermediate layer 38d thereof and into corresponding notches 124 in intermediate layer 34d of the grip pad 10d to retain the tray 108 in the horizontal slot 112. The inclined slot 116 can be formed in both the intermediate layer 38d and the top layer 54d, and can extend vertically at an incline into the grip pad 10d behind the slots 74 of the side walls 70. Placing the tray 108 in the inclined slot 116 repositions the wireless charger 96 behind slots 74 in the side walls 70, and thus behind the cell phone 14. The tray 108 can close the inclined slot 116 when the tray 108 is in the horizontal slot 112, as shown in FIG. 27, to resist debris accumulation.

It is to be understood that the examples set forth herein are not limited to the particular structures, process steps, or materials disclosed, but are extended to equivalents thereof as would be recognized by those ordinarily skilled in the relevant arts. It should also be understood that terminology employed herein is used for the purpose of describing particular examples only and is not intended to be limiting.

Furthermore, the described features, structures, or characteristics may be combined in any suitable manner in one or more examples. In the description, numerous specific details are provided, such as examples of lengths, widths, shapes, etc., to provide a thorough understanding of the technology being described. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the foregoing examples are illustrative of the principles of the invention in one or more particular applications, it will be apparent to those of ordinary skill in the art that numerous modifications in form, usage and details of implementation can be made without the exercise of inventive faculty, and without departing from the principles and concepts described herein. Accordingly, it is not intended that the invention be limited, except as by the claims set forth below.

What is claimed is:

1. A grip pad configured for holding a mobile device with respect to a support surface, the grip pad comprising:
   a) a flexible base layer having a bottom surface configured to be disposed on the support surface;
   b) the base layer comprising a tacky material and the bottom surface being tacky and configured to cling to the support surface;
   c) the base layer being flexible and configured to substantially conform to the support surface, the base layer being conformal between:

i) a flat configuration in which the base layer and the bottom surface are planar; and
  ii) a non-flat configuration in which the base layer and the bottom surface are non-planar;
d) a rigid intermediate layer carried by the base layer, the intermediate layer remaining rigid and a bottom thereof remaining planar when the base layer is in the non-flat configuration, and defining a gap between the intermediate layer and the base layer when the base layer is in the non-flat configuration;
e) a top layer carried by the intermediate layer and having a top surface configured to receive the mobile device; and
f) the top layer comprising a tacky material and the top surface being tacky.

2. The grip pad in accordance with claim 1, wherein the top layer is semi-rigid and is less rigid than the intermediate layer and is more rigid than the base layer.

3. The grip pad in accordance with claim 1, wherein the top layer remains planar when the base layer is in the non-flat configuration.

4. The grip pad in accordance with claim 1, wherein the base, intermediate and top layers are each formed from a different material with respect to the others.

5. The grip pad in accordance with claim 4, wherein the base layer comprises a silicone composite material, the intermediate layer comprises acrylonitrile butadiene styrene (ABS), and the top layer comprises thermoplastic polyurethane (TPU), thermoplastic rubber (TPR), or thermoplastic elastomer (TPE).

6. The grip pad in accordance with claim 1, further comprising:
  apertures in the top layer and extending to the intermediate layer with the intermediate layer visible through the apertures.

7. The grip pad in accordance with claim 1, wherein at least 10% of the flexible base is attached to the intermediate layer.

8. The grip pad in accordance with claim 1, further comprising:
  a lateral attachment band between the base layer and the intermediate layer, the lateral attachment band extending laterally.

9. The grip pad in accordance with claim 1, further comprising:
  raised lateral side walls extending above the top layer at lateral sides of the top layer.

10. The grip pad in accordance with claim 9, further comprising:
  a slot in each of the side walls and inclined at an acute angle with respect to the top surface.

11. The grip pad in accordance with claim 10, further comprising:
  the top layer being laterally bifurcated to form the slot in each side wall, and laterally across the top layer.

12. The grip pad in accordance with claim 1, further comprising:
  the intermediate layer having a variable thickness defining a wedge with the top layer at an acute angle with respect to the bottom layer.

13. The grip pad in accordance with claim 1, further comprising:
  a cavity formed in the top layer, or the intermediate layer, or both; and
  a wireless charger disposed in the cavity.

14. The grip pad in accordance with claim 13, wherein the wireless charger is movable between:
  a flat orientation substantially flush with and parallel to the top surface; and
  an upright orientation substantially inclined with respect to the top surface.

15. A grip pad configured for holding a mobile device with respect to a support surface, the grip pad comprising:
  a) a flexible base layer having a bottom surface configured to be disposed on the support surface;
  b) the base layer comprising a tacky material and the bottom surface being tacky;
  c) a rigid intermediate layer carried by the base layer;
  d) the intermediate layer having a variable thickness defining a wedge with the top layer at an acute angle with respect to the bottom layer;
  e) a top layer carried by the intermediate layer and having a top surface configured to receive the mobile device; and
  f) the top layer comprising a tacky material and the top surface being tacky.

16. The grip pad in accordance with claim 15, further comprising:
  a cavity formed in the intermediate layer; and
  a wireless charger disposed in the cavity of the intermediate layer.

17. The grip pad in accordance with claim 16, wherein the wireless charger is movable between:
  a flat orientation substantially flush with and parallel to the top surface; and
  an upright orientation substantially inclined at an acute angle with respect to the top surface.

18. The grip pad in accordance with claim 15, further comprising:
  raised lateral side walls extending above the top layer at lateral sides of the top layer; and
  a slot in each of the side walls.

19. The grip pad in accordance with claim 18, further comprising:
  a) a horizontal slot extending into the intermediate layer and the top layer from a front;
  b) an inclined slot extending into the top layer and the intermediate layer from a top; and
  c) a tray removably and selectively received in one of the horizontal or inclined slot, the tray carrying a wireless charger.

20. The grip pad in accordance with claim 15, further comprising:
  the base layer being flexible and configured to substantially conform to the support surface, the base layer being conformal between:
    i) a flat configuration in which the base layer and the bottom surface are planar; and
    ii) a non-flat configuration in which the base layer and the bottom surface are non-planar; and
  the intermediate layer remaining rigid and a bottom thereof remaining planar when the base layer is in the non-flat configuration, and defining a gap between the intermediate layer and the base layer when the base layer is in the non-flat configuration.

21. A grip pad in combination with a mobile device and a support surface to hold the mobile device on the support surface, the grip pad comprising:
  a) a flexible base layer having a bottom surface disposed on the support surface;
  b) the base layer comprising a tacky material and the bottom surface being tacky and clinging to the support surface;

c) the base layer being flexible and configured to substantially conform to the support surface, the base layer being conformal between:
   i) a flat configuration in which the base layer and the bottom surface are planar; and
   ii) a non-flat configuration in which the base layer and the bottom surface are non-planar;
d) a rigid intermediate layer carried by the base layer, the intermediate layer remaining rigid and a bottom thereof remaining planar when the base layer is in the non-flat configuration, and defining a gap between the intermediate layer and the base layer when the base layer is in the non-flat configuration;
e) a top layer carried by the intermediate layer and having a top surface selectively receiving the mobile device; and
f) the top layer comprising a tacky material and the top surface being tacky and clinging to the mobile device.

\* \* \* \* \*